US011976853B2

(12) United States Patent
Gentry

(10) Patent No.: US 11,976,853 B2
(45) Date of Patent: *May 7, 2024

(54) HEAT-DRIVEN VAPOR-COMPRESSION SYSTEM FOR AIR CONDITIONING AND REFRIGERATION

(71) Applicant: HyperBorean, Inc., Wichita, KS (US)

(72) Inventor: Todd Gentry, Winfield, KS (US)

(73) Assignee: Hyperborean, Inc., Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,483

(22) Filed: May 2, 2022

(65) Prior Publication Data

US 2022/0260289 A1 Aug. 18, 2022

Related U.S. Application Data

(63) Continuation of application No. 17/008,171, filed on Aug. 31, 2020, now Pat. No. 11,320,181.

(Continued)

(51) Int. Cl.
*F25B 31/02* (2006.01)
*F25B 27/00* (2006.01)
(Continued)

(52) U.S. Cl.
CPC .......... *F25B 31/023* (2013.01); *F25B 27/005* (2013.01); *F25B 27/02* (2013.01);
(Continued)

(58) Field of Classification Search
CPC ...... F25B 31/023; F25B 27/005; F25B 27/02; F25B 31/008; F25B 33/00; F25B 39/00;
(Continued)

(56) References Cited

U.S. PATENT DOCUMENTS 3,470,707 A 10/1969 Lofgreen et al.
3,763,663 A 10/1973 Schlichtig
(Continued)

FOREIGN PATENT DOCUMENTS

CN 102927634 A * 2/2013
DE 202015005746 U1 * 6/2016
(Continued)

OTHER PUBLICATIONS

Translation CN-102927634-A (Year: 2013).*
Translation (Year: 2016).*

*Primary Examiner* — David J Teitelbaum
(74) *Attorney, Agent, or Firm* — Grady L. White; Potomac Law Group, PLLC

(57) ABSTRACT

Embodiments of the present invention reduce the amount of energy required to operate air-conditioners and refrigerators by providing a vapor-compression system that harnesses a low- or no-cost source of energy, namely, heat, and uses the harnessed heat to power a new kind of compressor, called a "burst compressor" and a new kind of pump, called a "vapor pump." The heat-driven burst compressor pressurizes the refrigerant, while also providing "push and pull" vapor refrigerant to the vapor pump. The vapor pump, actuated by the high pressure refrigerant in gaseous form provided by the burst compressor, is configured to pump a combination of gaseous, vaporous and liquid refrigerant out of the receiver tank and inject that low pressure refrigerant mix into the burst compressor, where it is heated to change the state of the refrigerant to a heated, pressurized gas. Then the heated, pressurized gas is released in bursts into the other components of the vapor compression cycle. Thus, embodiments of the present invention use heat to provide cold. Because of this arrangement, vapor-compression systems constructed and arranged to operate according to embodiments of the present invention are able to provide air- (Continued)

conditioning and/or refrigeration much more efficiently and with much less expense than traditional vapor compression systems for air-conditioning and refrigeration.

16 Claims, 21 Drawing Sheets

Related U.S. Application Data

(60) Provisional application No. 62/894,422, filed on Aug. 30, 2019.

(51) Int. Cl.
    *F25B 27/02*     (2006.01)
    *F25B 31/00*     (2006.01)
    *F25B 33/00*     (2006.01)
    *F25B 39/00*     (2006.01)
    *F25B 41/20*     (2021.01)
    *F25B 41/40*     (2021.01)

(52) U.S. Cl.
    CPC ............ *F25B 31/008* (2013.01); *F25B 33/00* (2013.01); *F25B 39/00* (2013.01); *F25B 41/20* (2021.01); *F25B 41/40* (2021.01); *F25B 2327/001* (2013.01); *F25B 2400/07* (2013.01)

(58) Field of Classification Search
    CPC .... F25B 41/20; F25B 41/40; F25B 2327/001; F25B 2400/07
    See application file for complete search history.

(56) References Cited

U.S. PATENT DOCUMENTS

| | | | |
|---|---|---|---|
| 4,213,305 A | | 7/1980 | De Geus |
| 4,246,885 A | * | 1/1981 | Austin ................... F24S 50/20 |
| | | | 126/584 |
| 4,281,969 A | | 8/1981 | Doub, Jr. |
| 4,918,937 A | | 4/1990 | Fineblum |
| 5,214,932 A | | 6/1993 | Abdelmalek |
| 9,664,421 B1 | | 5/2017 | El-Shaarawi |
| 2005/0011214 A1 | | 1/2005 | Ratliff |
| 2011/0072849 A1 | | 3/2011 | Kuehl et al. |
| 2011/0219801 A1 | * | 9/2011 | McKenzie ............ F25B 27/005 |
| | | | 62/235.1 |
| 2016/0003504 A1 | | 1/2016 | Sakamoto et al. |
| 2017/0219257 A1 | | 8/2017 | El-Shaarawi |

FOREIGN PATENT DOCUMENTS

| | | |
|---|---|---|
| JP | 2004028369 A | 1/2004 |
| JP | 2007530897 A | 11/2007 |
| KR | 20150086589 A | 7/2015 |

* cited by examiner

HEAT-DRIVEN VAPOR-COMPRESSION SYSTEM FOR AIR CONDITIONING AND REFRIGERATION

FIELD OF THE INVENTION

The present invention relates generally to the field of air-conditioning and refrigeration, and more particularly to vapor-compression systems used to provide air-conditioning and refrigeration in enclosed spaces.

RELATED ART

Air-conditioning systems for homes, commercial buildings, automobiles and other enclosed spaces remove heat from the air by circulating a liquid refrigerant through a vapor-compression system. The vapor-compression system comprises a closed loop of transport tubes and heat exchanging devices, such as condensers and evaporators. The transport tubes carry the refrigerant in vapor form to an evaporator located in an enclosed space to be cooled. The vapor in the evaporator is at an operating pressure which allows it to boil to a gaseous state at a low temperature. When air from the space that is to be cooled is passed through the evaporator, the refrigerant in the evaporator boils from the heat of the air that is passing through the evaporator, thereby absorbing heat from that space and transferring that heat to the refrigerant. The refrigerant carrying the heat is drawn into the compressor where it is put under a greater pressure and undergoes a phase change to heated gas, and is then pumped through the transport tubes to a condenser located in a different place, typically outdoors, where the previously absorbed heat is then released into the outside atmosphere and the gas condenses into a vapor under high pressure. After the heat is released outdoors, the vaporous refrigerant is then forced through a throttling value where its operating pressure is reduced to a level where it boils at a lower temperature and is then recirculated back to the evaporator which is located in the space to be cooled, where the whole process is repeated until the temperature of the air inside the enclosed space falls to the desired, more comfortable level.

Vapor-compression systems are also widely used in domestic and commercial refrigerators, large-scale warehouses for chilled or frozen storage of foods and meats, refrigerated trucks and railroad cars, and a host of other commercial and industrial services. Oil refineries, petrochemical and chemical processing plants, and natural gas processing plants are among the many types of industrial plants that often utilize large vapor-compression refrigeration systems.

The path traveled by the refrigerant as it circulates throughout the vapor-compression system is called a vapor compression cycle, which contains at least four components, namely, a compressor, a condenser, a thermal expansion valve (also called a throttling valve or metering device), and an evaporator. The refrigerant is pressurized and moved through the vapor compression cycle by operation of the compressor. The air is moved through the condenser and the evaporator by fans outside the compression loop, but close enough to the condenser and the evaporator to blow air into and across the coils of the condenser and evaporator so that the heat in the air can be absorbed by the evaporator and released by the condenser. The fans are typically operated by electric motors.

Vapor-compression systems consume energy in order to perform three functions. The first function that requires and consumes energy is powering the motors that turn the fan blades that move air across the coils of the condenser and the evaporator. The second function that requires and consumes energy is powering the motors of the compressor, which pressurizes the refrigerant (to make the refrigerant undergo a phase change necessary for proper evaporation). The third function (also performed by the compressor) is forcing the pressurized refrigerant to move through the rest of the components in the vapor compression loop (transport tubes, heat exchangers, throttles and valves). The compressor that performs the second and third functions is typically powered by an electric motor or by a spinning belt driven by an automotive engine.

In a conventional vapor-compression system, the motor that runs the compressor requires and consumes an enormous amount of electricity or fuel, far exceeding the amount of electricity or fuel required and consumed by the motors that turn the fans. Compressor motors also frequently wear out and break down, and therefore frequently need repairing or replacement, which can also be extremely expensive. Consequently, providing electricity or fuel for the compressor, and repairing or replacing the compressor when it eventually breaks down, are typically the most expensive and frustrating aspects of using and maintaining a conventional vapor-compressing system for generating air-conditioning and refrigeration.

Moreover, electrically-driven motors and combustion engines used to run conventional compressors also produce a considerable amount of additional heat, which counteracts and undermines some of cooling effects that the vapor-compression system is designed to provide. It has been observed, for example, that running an air conditioner in an automobile reduces the automobile's fuel efficiency, defined as how far the automobile can travel per unit of fuel, by as much as six percent (6%) because a significant portion of the fuel combustion energy is diverted from the task of providing locomotion and is instead used to compress the refrigerant and drive the refrigerant through the automobile's vapor compression cycle.

Thus, the benefit of using a conventional vapor-compression system has heretofore been somewhat limited (or offset) by the cost of the energy required to run the motors for the compressor, as well as the additional unwanted heat introduced while the compressor motor is running, and which the air-conditioning or refrigeration system must work harder to overcome. Accordingly, there is considerable need in the air-conditioning and refrigeration industries for a vapor-compression system that reduces or eliminates the considerable expense and additional heat associated with compressing the refrigerant and forcing the refrigerant to circulate through the vapor compression cycle.

SUMMARY OF THE INVENTION

Heat is the most abundant source of energy on earth. The primary source of heat in the world is the sun, of course. In addition to heat provided (or derived from) the sun, a tremendous amount of heat is produced as an unavoidable waste-product of open flames and the large numbers of machines, motors, engines, artificial lights, chemical processes and other devices and processes that are typically at work all around us. In other words, unlike air-conditioning or refrigeration, collecting heat is typically very easy and very inexpensive.

Embodiments of the present invention reduce the amount of energy required to operate air-conditioners and refrigerators by providing a vapor-compression system that harnesses a low- or no-cost source of energy, namely, heat, and uses the harnessed heat to power a new kind of compressor, called a "burst compressor" and a new kind of pump, called a "vapor pump." The heat-driven burst compressor pressurizes the refrigerant, while also providing pressurized gaseous refrigerant to the vapor pump which is used to drive the vapor pump's "push and pull" operations. The vapor pump, actuated by the gaseous refrigerant provided by the burst compressor, is configured to draw refrigerant that has passed through the evaporator and force it into the burst compressor.

The refrigerant that has been expelled from the evaporator is a low-pressure vapor and gas combination. This mixture accumulates in a receiver tank in the system after it is expelled from the evaporator. The receiver tank also contains a residual level of liquid refrigerant. This low pressure mix of refrigerant, which is now in a gaseous, vaporous and liquid state, is drawn from a receiver tank into the vapor pump through its pumping action, and then is forced into the heated burst compressor where it undergoes a rapid phase change into a heated gas and increases dramatically in pressure. The heated gas is then released in bursts from the burst compressor and that gas enters the primary condenser of the system and begins the vapor compression cycle of moving through the other components of the vapor compression system. Put another way, embodiments of the present invention use heat to provide cold. Because of this arrangement, vapor-compression systems constructed and arranged to operate according to embodiments of the present invention are able to provide air-conditioning and/or refrigeration much more efficiently and with much less expense than traditional vapor compression systems for air-conditioning and refrigeration.

In general, embodiments of the present invention provide a system for cooling air in an enclosed space, comprising a refrigerant, an evaporator located within the enclosed space and operable to cause the refrigerant to absorb heat from the air in the enclosed space. A condenser located outside of the enclosed space is configured to allow the refrigerant to reject the absorbed heat into the second space. A closed-loop circulation system fluidly connects the evaporator and the condenser, and allows the refrigerant to be repetitively circulated through the evaporator and the condenser. A vapor pump, fluidly connected to the closed-loop circulation system, is configured to repetitively pump refrigerant from the receiver tank on the low pressure side of the vapor compression system into the burst compressor. And finally, a heat-driven burst compressor, fluidly connected to the closed-loop circulation system and the vapor pump, powers the operation of the vapor pump by pressurizing the refrigerant and injecting a portion of the pressurized refrigerant into the vapor pump to act on its drive piston, which is connected to the vapor pump's injection piston. The injection of pressurized refrigerant into the vapor pump causes the vapor pump to draw low pressure refrigerant from the receiver tank into the vapor pump and then forces that refrigerant into the burst compressor, where it is re-pressurized and released in bursts to the condenser, where it is condensed and evaporated all over again to produce colder air.

BRIEF DESCRIPTION OF THE FIGURES

The accompanying drawings, which are incorporated in and constitute part of the specification, illustrate preferred embodiments of the invention, and, together with the description, serve to explain the principles of the present invention. In the drawings, like reference numbers indicate identical or functionally similar elements. Additionally, the left-most digit(s) of a reference number identifies the drawing in which the reference number first appears.

FIG. 16 shows an exploded view of the vapor compression system, illustrating the relative locations of the burst compressor, the primary condenser, the secondary condenser and the vapor pump, all of which would normally be hidden from view underneath a vented enclosure that covers the condenser unit.

DETAILED DESCRIPTION OF THE PREFERRED EMBODIMENTS

Figure 1:
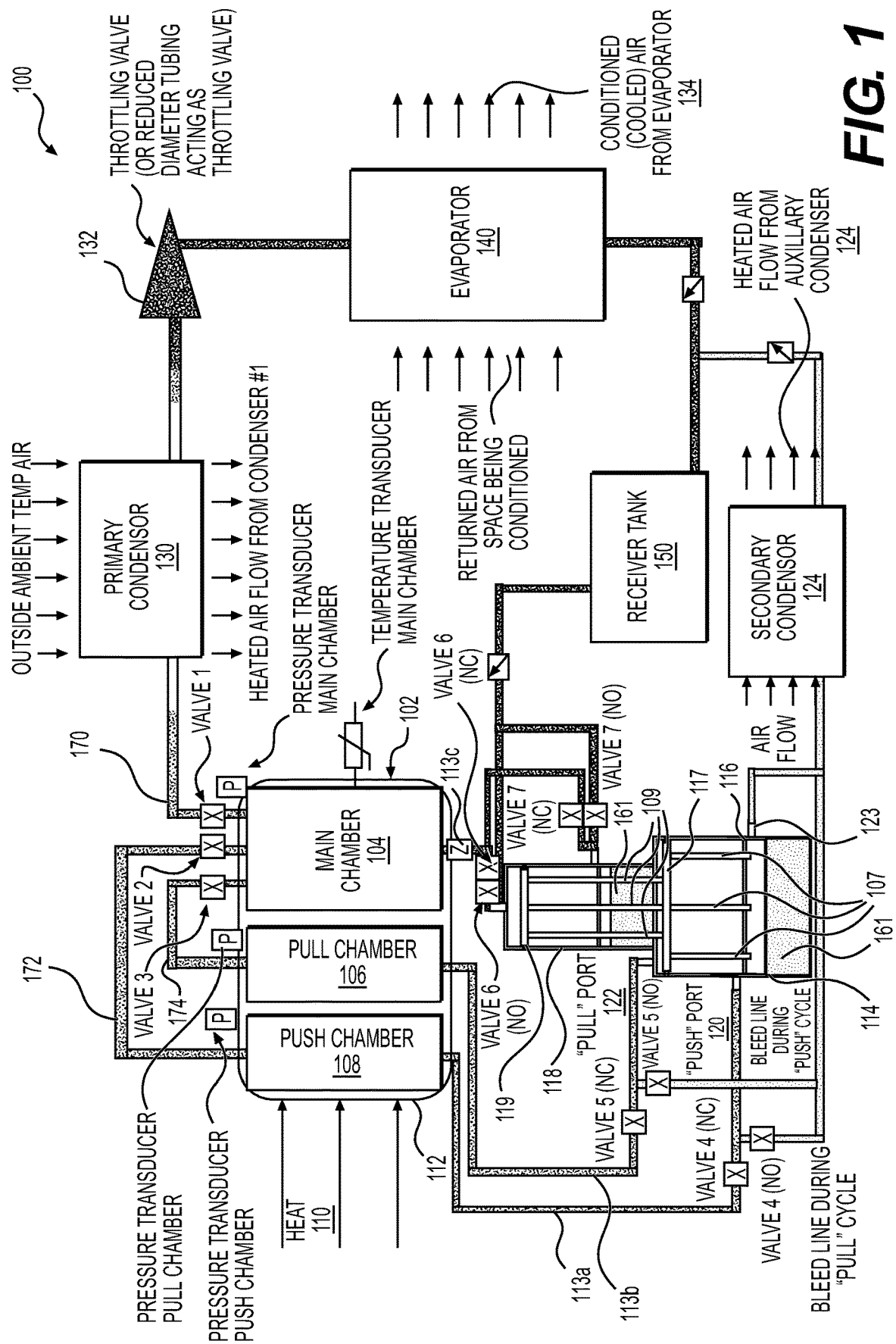
FIG. 1 shows a high-level block diagram illustrating the physical components of the vapor compression cycle constructed and configured to operate in accordance with an exemplary embodiment of the present invention.

Reference will now be made in detail to the preferred embodiments of the present invention, examples of which are illustrated in the accompanying drawings.

As stated previously, vapor-compression systems traditionally have four components: a compressor, a condenser, a thermal expansion valve (also called a throttle valve or metering device), and an evaporator. Circulating refrigerant enters the compressor in the thermodynamic state known as a saturated vapor and is compressed to a higher pressure, resulting in a higher temperature as well. The hot, compressed vapor is then in the thermodynamic state known as a superheated vapor and it is at a temperature and pressure at which it can be condensed with either cooling water or cooling air flowing across the coil or tubes. This is where the circulating refrigerant rejects heat from the system and the rejected heat is carried away by either a flow of the water or the flow of air (whichever may be the case) through the condenser.

The condensed liquid refrigerant, which is now in the thermodynamic state known as a saturated liquid, is next routed through an expansion valve where it undergoes an abrupt reduction in pressure. That pressure reduction results in the adiabatic flash evaporation of a part of the liquid refrigerant. The auto-refrigeration effect of the adiabatic flash evaporation lowers the temperature of the liquid and vapor refrigerant mixture to where it is colder than the temperature of the enclosed space to be refrigerated.

The cold mixture is then routed through the coil or tubes in the evaporator. The evaporator is where the circulating refrigerant absorbs and removes heat which is subsequently rejected in the condenser and transferred elsewhere by the water or air used in the condenser. A fan circulates the warm air in the enclosed space across the coil or tubes carrying the cold refrigerant liquid and vapor mixture. That warm air evaporates the liquid part of the cold refrigerant mixture. At the same time, the circulating air is cooled and thus lowers the temperature of the enclosed space to the desired temperature. To complete the refrigeration cycle, the refrigerant vapor exiting from the evaporator is again in the form of a saturated vapor and is routed back into the compressor.

The key to efficient operation of a vapor-compression system is getting the proper amount of refrigerant to flow through the evaporator as a low-pressure vapor. To this end, embodiments of the present invention utilize a vapor-compression system comprising a special three-chambered compressor, called a "burst compressor," to pressurize the refrigerant. The burst compressor is powered by a heat source configured to direct heat on an exterior wall of the burst compressor to heat the refrigerant inside the burst compressor. The system preferably includes a plurality of pressure sensors and temperature sensors to monitor pressures and temperatures in the burst compressor, a plurality of valves positioned at key locations in the vapor compression cycle to control the flow of the refrigerant, and a vapor pump.

The vapor pump contains two cylinders that are driven by pressurized vapor expelled from two of the three chambers in the burst compressor to help "push" and "pull" the refrigerant from the vapor compression cycle into the burst compressor. A control system, comprising a logic controller, may be connected to the system via signal communication lines, and configured to send electronic signals to the plurality of valves to open and close the valves based on pressure and temperature readings obtained from the plurality of pressure sensors and temperature sensors. Through the application of heat to three-chambered burst compressor and the strategic control of the valves based on the temperature and pressure readings at various locations in the vapor compression cycle, embodiments of the present invention move the proper mass of refrigerant through the evaporator as a low pressure vapor in order to generate air-conditioning and refrigeration more efficiently than conventional vapor compression systems.

The Burst Compressor Drives the Vapor Compression Cycle

The vapor pump draws a mix of refrigerant gas, refrigerant vapor and liquid refrigerant from a receiver located on the low-pressure side of the vapor compression system and forces that mix of refrigerant into the main chamber of the burst compressor. Once in the main chamber, the refrigerant changes state to a high-pressure gas, due to the convection heating of the gas from the heated burst compressor chamber. The refrigerant is held captive in the burst compressor main chamber until the change of state to a gas is complete. Once the refrigerant is in a fully gaseous state and is at its maximum pressure in the confined volume of the burst compressor main chamber, a valve is opened and a portion of that gas is released in a burst into the primary condenser of the system. Because the pressure of the gas in the burst compressor main chamber is greater than the pressure of the gas entering the primary condenser, the gas in the burst compressor main chamber flows to the lower pressure area of the primary condenser. This begins the vapor compression cycle. After a defined mass of refrigerant gas has flowed from the burst compressor main chamber to the primary condenser, the valve between the burst compressor main chamber and the primary condenser is closed, and the burst compressor main chamber becomes a closed volume chamber once again.

Secondary Condenser

The vapor pump is driven through application of high-pressure refrigerant gas to alternating sides of the drive piston in the drive cylinder of the vapor pump. As refrigerant gas is applied to a surface of the drive piston, the piston is forced to the end of its stroke in the drive cylinder as the pressurized gas fills the cylinder on the side of the drive piston that is being pressurized. The gas that is on the opposite side of the drive piston from which the pressurized gas is being applied, is displaced as the piston travels in the cylinder.

This displaced gas flows through valves and tubing into a secondary condenser. In the secondary condenser, the displaced gas changes state from a gas to a vapor. The vapor then travels from the secondary condenser into a receiver tank on the low-pressure side of the system. The gas is forced into the secondary condenser by the action of the drive piston of the vapor pump moving through the drive cylinder. The gas in the secondary condenser, which changes state in the condenser to a vapor, is at a higher pressure than the low-pressure side of the vapor compression system. The secondary condenser serves to convert the displaced gas into a denser state of a vapor. By introducing a vapor into the receiver tank, rather than a gas, the system becomes more efficient by allowing a greater mass of refrigerant to collect in the receiver due to all of the refrigerant present being in its densest possible state. By allowing the maximum mass of refrigerant to accumulate, the system operates more efficiently by keeping the pressure of the low-pressure side within the operating specifications by making the most efficient use of the volume of the receiver.

Figure 15:
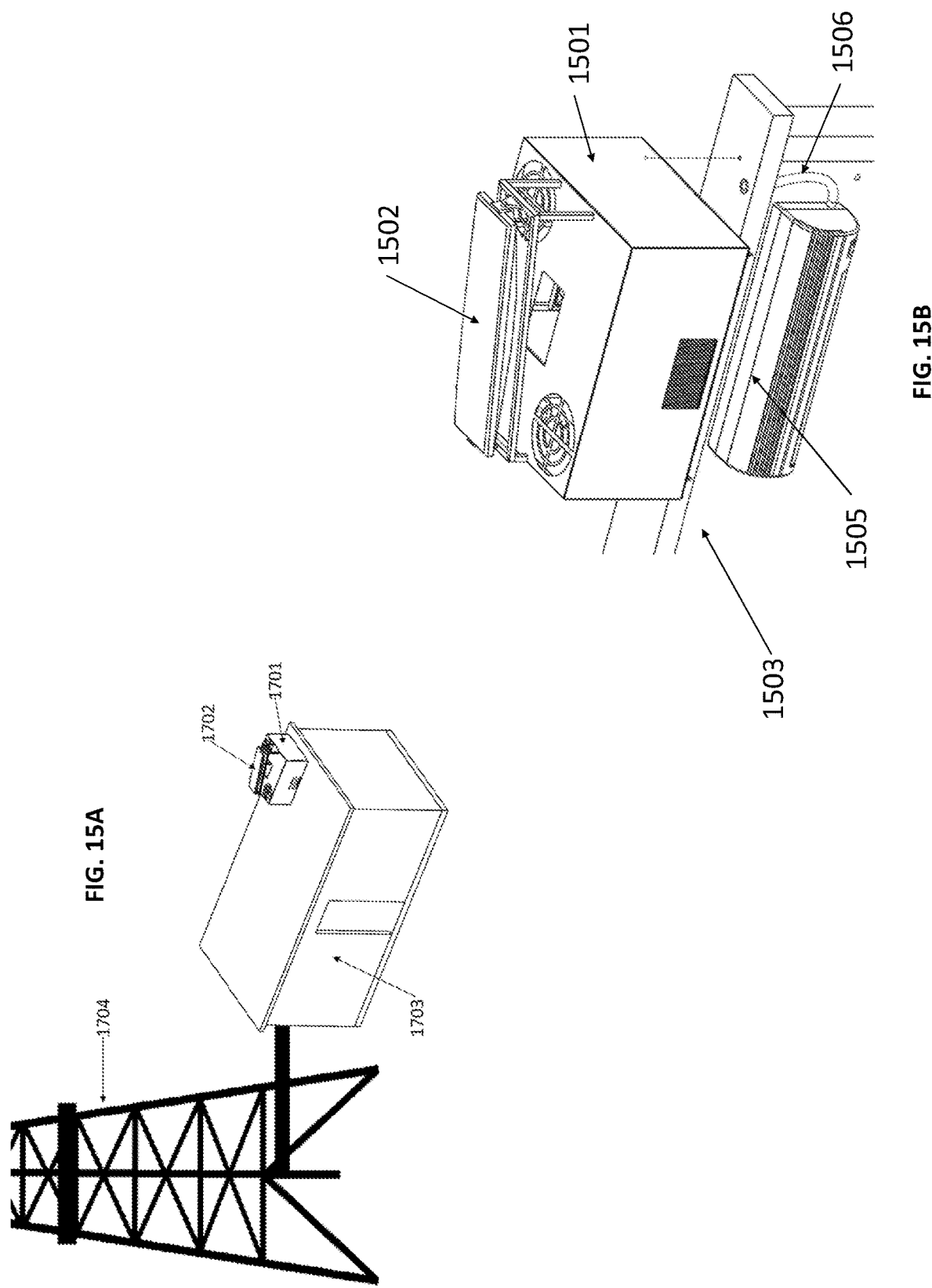
FIGS. 15A, 15B and 16 show high-level schematic diagrams illustrating, by way of example, how an embodiment of the present invention may be installed and used for cooling a single room structure containing heat-sensitive equipment.
Figure 16:
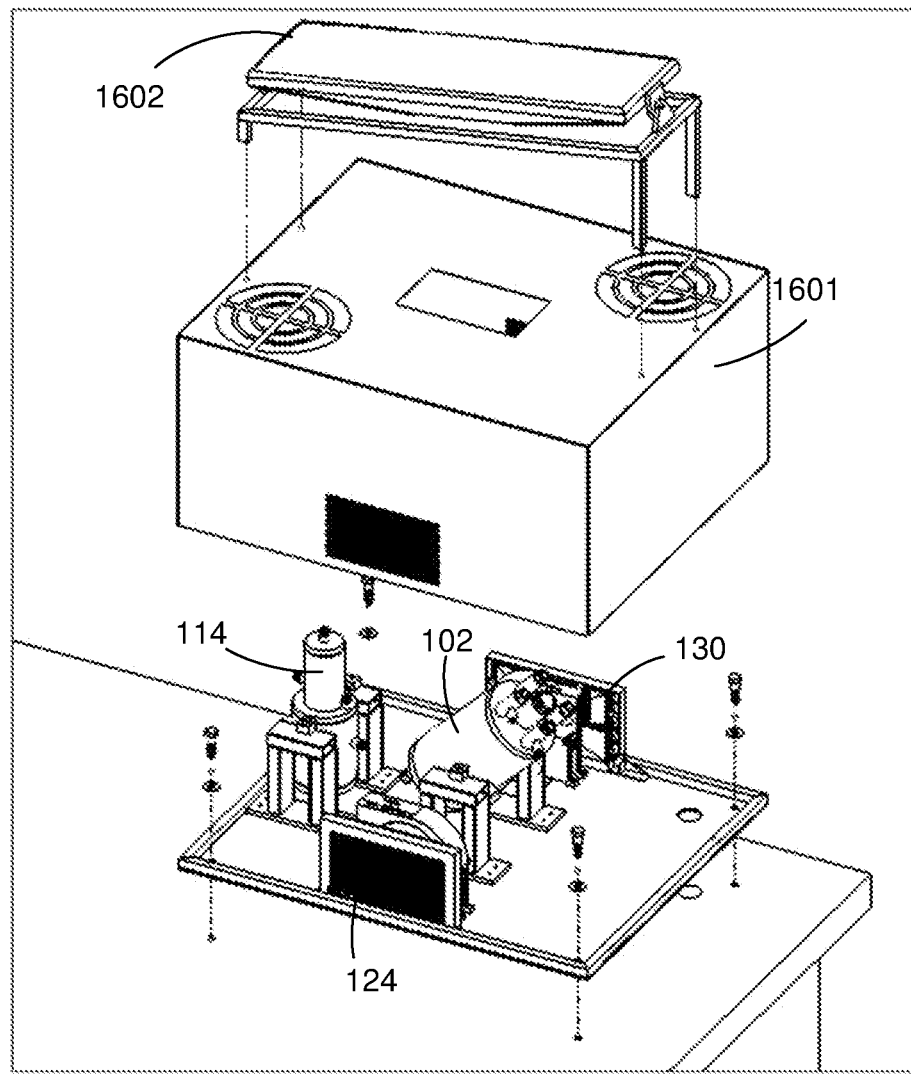

FIG. 1 shows a high-level block diagram illustrating the physical components of the vapor compression system 100 constructed and configured to operate in accordance with an exemplary embodiment of the present invention. As shown in FIG. 1, the vapor compression loop 100 of the present invention comprises a burst compressor 102, a primary condenser 130, a throttle valve 132, an evaporator 140, a receiver tank 150, a secondary condenser 124, a vapor pump 114, and a network of circulation tubing and valves arranged to carry refrigerant between the various components of the vapor compression loop 100. For simplicity in the drawing, the control system, which includes a logic controller configured to receive measurements and readings from the sensors and, based on those measurements and readings, automatically generate and transmit to the valves signals that cause the valves to open and close at the correct times, is not shown in FIG. 1. However, it will be understood that the valves and sensors shown in the vapor compression system 100 of FIG. 1 are electronically connected to such a control system (not shown in FIG. 1), which typically logic controller control system, which is best shown in FIGS. 15 and 16, and discussed in more detail below.

Returning to FIG. 1, the burst compressor 102 includes three chambers, referred to as the main chamber 104, the push chamber 106 and the pull chamber 108. The three-chambered structure of the burst compressor 102 allows for simultaneous and efficient heating of the refrigerant (not shown in FIG. 1 for simplicity) in the main chamber 104, the pull chamber 106 and push chamber 108 of the burst compressor 102. An external heat source (not shown in FIG. 1), directs heat 110 to an exterior wall 112 of the burst compressor 102. Preferably the external heat source directs the heat 110 to the external wall 112 that is closest to the push and pull chambers 106 and 108 of the burst compressor 102, which promotes even heating of all three chambers.

The refrigerant enters the main chamber 104 as a vapor. The heat 110 applied to the exterior wall 112 of the burst compressor 102 changes the vapor refrigerant inside the burst compressor 102 to a gas refrigerant, and thereby increases the working pressure within all of the chambers. The resulting high-pressure gas refrigerant is then injected into the high-pressure side of the vapor compression loop (containing the primary condenser 130, the throttling valve 132 and the evaporator 140, where gas refrigerant then undergoes condensing and evaporation, and thereby releases conditioned (cooled) air into the enclosed space to be cooled.

A variety of different external heat sources may be used to direct the heat 110 on the exterior wall 112 of the burst compressor 102. By way of example, the list of potential heat sources may include, for instance, a concentrated solar energy device, an open flame (as can be found in facilities with commercial dryers and food processing facilities), diesel and gasoline powered generators, the internal combustion engine of an automobile, to name but a few. Other heat sources may also be suitable, depending on the situation and the circumstances.

Figure 2:
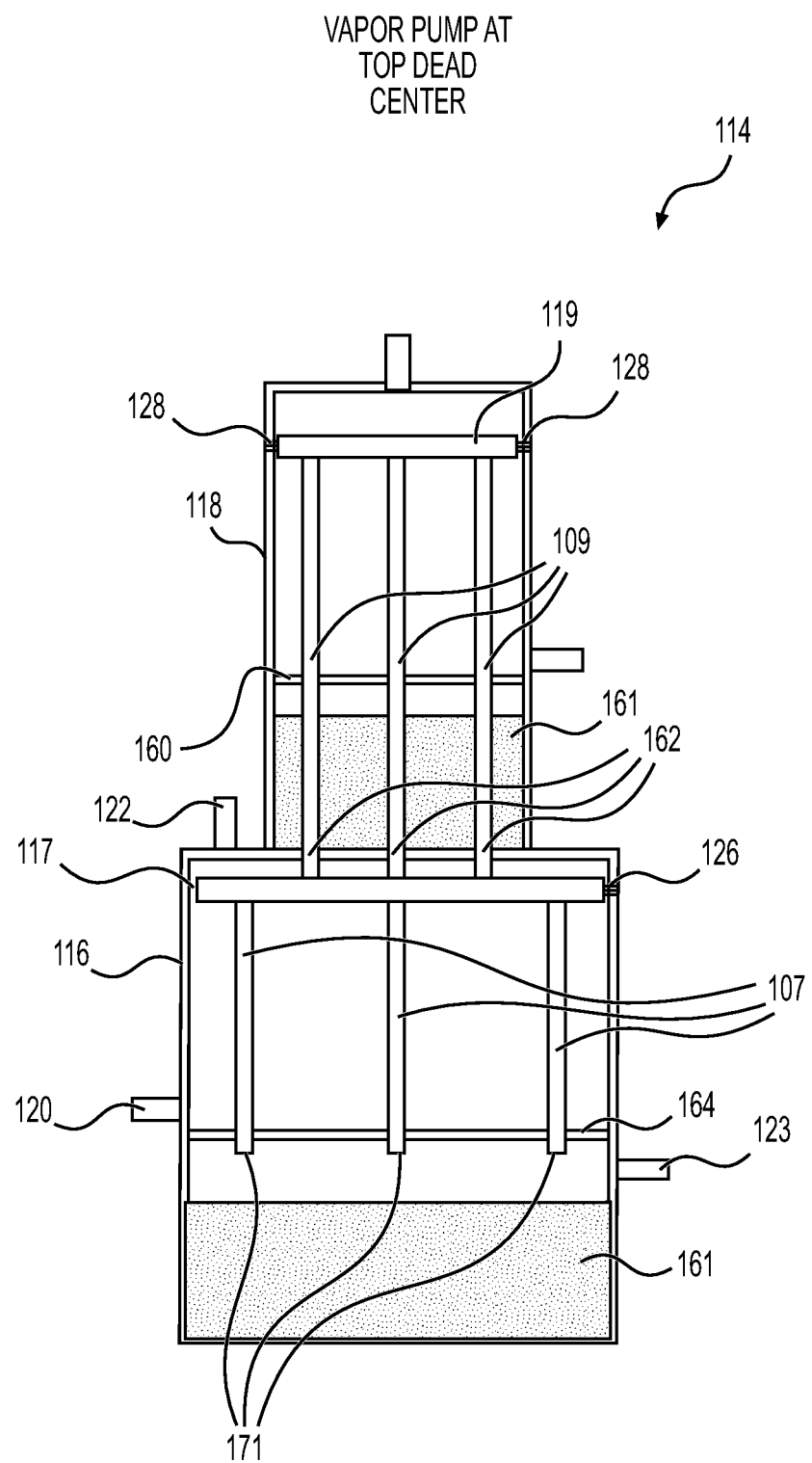
FIGS. 2 and 3 show more detailed diagrams of the vapor pump.
Figure 3:
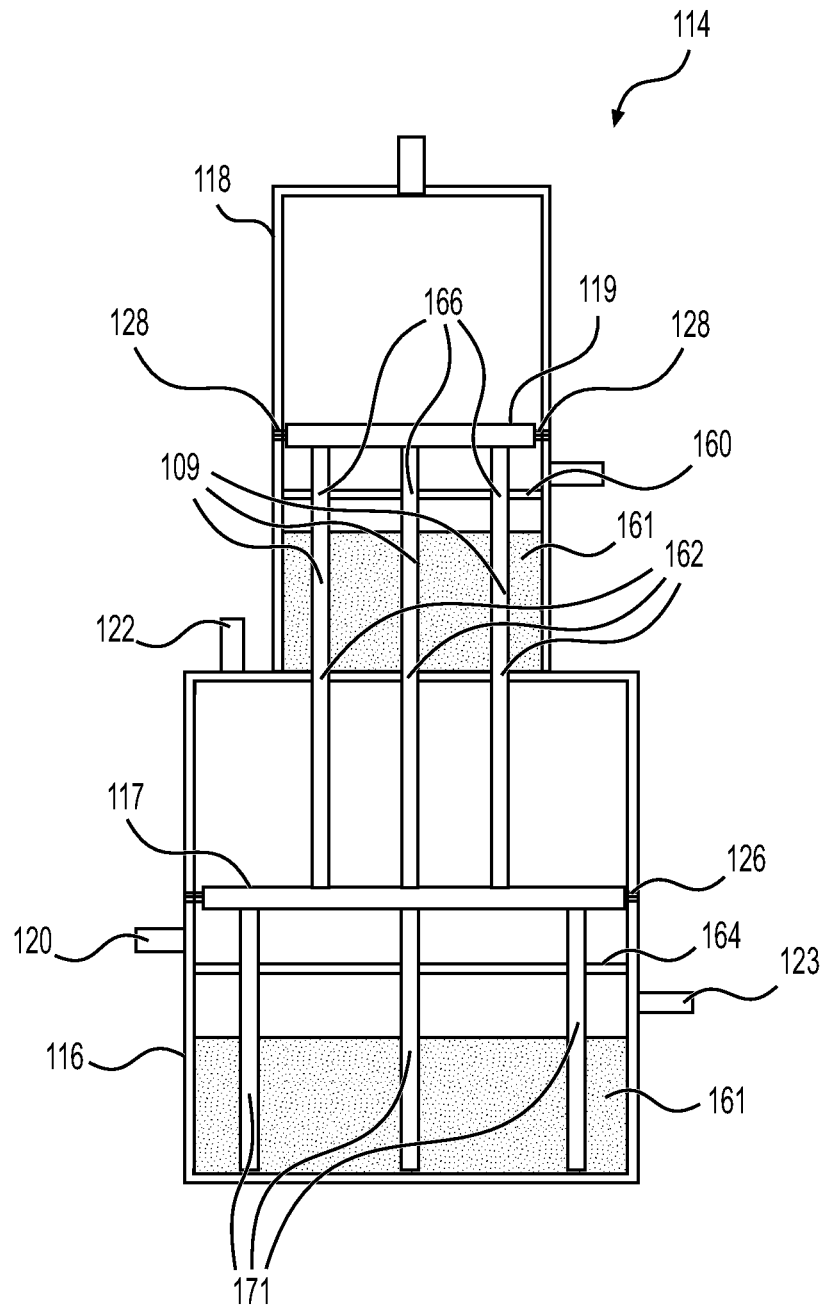

The push chamber 108 and the pull chamber 106 are both fluidly connected to drive cylinder 116 of a two-cylinder vapor pump 114 via circulation tubes 113a and 113b. Pressurized refrigerant gas located in the push chamber 108 of the burst compressor 102 is permitted to pass out of the push chamber 108 and through a transport tube 113a to drive a drive piston 117 disposed inside the drive cylinder 116 from a bottom dead center position in the drive cylinder 116 to a top dead center position in the drive cylinder 116, which causes an injection piston 119 located in an injection cylinder 118 of the vapor pump 114 to move in concert with the movement of the drive piston 117 in the vapor pump 114 and thereby force refrigerant located inside the injection cylinder 118 to move out of the injection cylinder 118 and into the main chamber 102 of the three-chambered burst compressor. FIGS. 2 and 3 show more detailed diagrams of the vapor pump 114. FIG. 2 shows a diagram with of the vapor pump 114 with the pistons 117 and 119 in the top dead center position, while FIG. 3 shows a diagram of the vapor pump 114 with the pistons 117 and 119 located in the bottom dead center position.

As shown best in FIGS. 2 and 3, the vapor pump 114 comprises a drive piston 117 that travels up and down inside drive cylinder 116 in synchronization with an injection piston 119 that travels up and down inside the injection cylinder 118. Torsional deflection (a piston running unevenly in a cylinder) can result from the dynamic behavior of superheated gas applying pressure to the surface of the piston. Torsional deflection can cause increased ring blowby and excessive wear on the rings 126 and 128. Three evenly spaced vertical connecting rods 109 in the injection cylinder 118 fixedly connect the injection piston 119 to the top of the drive piston 117. The placement of the three connecting rods 109 prevents torsional deflection of the injection piston 119 as it travels up and down inside the injection cylinder 118. A guide plate 160 with bushings 166 for the connecting rods 109 and with vent holes (not shown in the figures for the sake of simplicity) ensures that the connecting rods 109 run true. The vented guide plate 160 permits refrigerant gas to flow both above and below the guide plate 160 to maintain equal pressure on both sides of the guide plate 160 at all times.

In the drive cylinder 116, three evenly spaced, vertical connecting rods 107 running through a lower sealed guide plate 164 stabilize the drive piston 117 in the drive cylinder 116, preventing torsional deflection of the drive piston 117 as it travels in the drive cylinder 116. The sealed guide plate 164 with sealed bushings 172 for the connecting rods 107 ensures that connecting rods 107 run true. Seals 126 on the guide plate 164 allow full pressure to be realized in the area of the drive cylinder 116 above the guide plate 164 to drive the drive piston 117 upwards from the bottom dead center position to the top dead center position.

Refrigerant oil 161 in the bottom of both cylinders increases the lifespan of the piston seals 126 and 128 for the connecting rods 107 and the piston rings 126 on the drive piston 117 and of the cylinder walls. Blowby from either side of the drive piston 117 is captured on the other side of the drive piston 117 and returned to the system on the corresponding piston stroke. Sealed bushings 162 between upper and lower cylinders of the vapor pump ensure that the connecting rods 109 run true. The sealed bushings 162 ensure that full pressure is realized in both pump cylinders, to facilitate efficient operation of the pump. Blowby from either side of the drive piston 117 is captured on the other side of the drive piston 117 and returned to the system on the corresponding piston stroke.

The vapor pump 114 injects refrigerant into the burst compressor 102 on both its upward and downward strokes. By so doing, it cuts the overall duty cycle of the system in half, making the vapor pump 114 and system twice as efficient at moving refrigerant around the vapor compression loop.

Together, FIGS. 1, 2 and 3 illustrate that, as the drive piston 117 and the injection piston 119 of the vapor pump 114 are driven from the bottom dead center position to the top dead center position by the pressure of the refrigerant coming from the push chamber 108, the injection piston 119 of the vapor pump 114 forces refrigerant vapor from the low-pressure side of the vapor compression loop into the main chamber 104 of the burst compressor 102. Refrigerant gas from the pull chamber 106 is used to drive the drive piston 117 and the injection piston 119 in the vapor pump 114 from top dead center back to bottom dead center, which draws vapor from the low-pressure side of the system back into the injection cylinder 118.

The vapor pump 114 has a dual action configuration, which means pressure can be applied to the push port 120 of the vapor pump 114 to force the drive piston 117 and the injection piston 119 to move upward inside the drive cylinder 116 and the injection cylinder 188, respectively, and pressure can be applied to the pull port 122 of the vapor pump 114 to force the drive piston 117 and the injection piston 119 downward. A vent port 123 on vapor pump 114 permits "exhaust" refrigerant inside the drive cylinder 116 to pass into a secondary condenser 124, where it is then injected into the low-pressure side of the vapor compression loop 100. This arrangement serves to maintain a closed system and insures conservation of mass within the system.

Typically, the drive piston 117 requires between 80 and 140 psi of pressure to be applied to its input ports to drive it to its full capacity. Because the refrigerant passing through the vent port 123 is subject to "backpressure," which is the operating pressure of the low-pressure side of the system, the push and pull pressures on the vapor pump 114 are set to be a net 120 psi via the software of the connected control system (discussed in more detail below). As an example, if the low-pressure side of the system is operating at an average of 220 psi, then the control system will apply 340 psi to the push port 120 and the pull port 122 in order to create a net 120 psi input to drive the pistons 117 and 119.

On both the upward and downward strokes of the pistons in the vapor pump 114, refrigerant is forced into the main chamber 104 of the burst compressor 102. The dual action configuration of the vapor pump 114 makes it twice as efficient as a standard reciprocal compressor in a conventional vapor-compression system, and thereby makes as efficient use as possible of the superheated refrigerant gas expelled from push chamber 108 and the pull chamber 106.

As best shown in FIGS. 2 and 3, the vapor pump 114 has piston rings 126 and 128, which are attached to the circumferences of the drive piston 117 and the injection piston 119, respectively. "Blowby" is a condition in which a minute amount of refrigerant gas passes by the piston rings 126 and 128 of the pistons 117 and 119, respectively, on each stroke of the pistons. The gas which escapes past the rings is the "blowby" gas. The vapor pump 114 is advantageously and beneficially designed to capture the blowby gas and re-introduce it into the system with no degradation of system performance or loss of refrigerant to the atmosphere.

The heat 110 applied to the external wall 112 of the burst compressor 102 can be in the form of concentrated solar from a collector, such as a Fresnel lens with a focal area in the form of a narrow band on the surface of the external wall 112 of the burst compressor 102. The heat 110 may also be produced by heat conduction from the burst compressor 102 being in direct contact with an internal combustion engine. The heat 110 can also come from contact with a direct flame, as might be found in a commercial dryer or similar process that involves open flames or intense heat.

Because vapor-compression systems of the present invention are able to operate using conventional refrigerants, and operates at fairly typical pressures for traditional vapor compression systems, our system can be integrated into existing vapor compression designs with the ability to switch seamlessly back and forth between the two systems.

In other words, an air-conditioning or refrigeration system for a single establishment may be configured to use the application of heat 110, a three-chambered burst compressor and a vapor pump in accordance with embodiments of the invention herein described when heat is available and can be used as the energy input to drive the refrigerant through the vapor compression cycle, and then seamlessly switch over to using a conventional vapor-compression system and conventional power sources (e.g., electrically-driven pumps and motors) when heat is not available to drive refrigerant through the vapor compression cycle.

Figure 4:
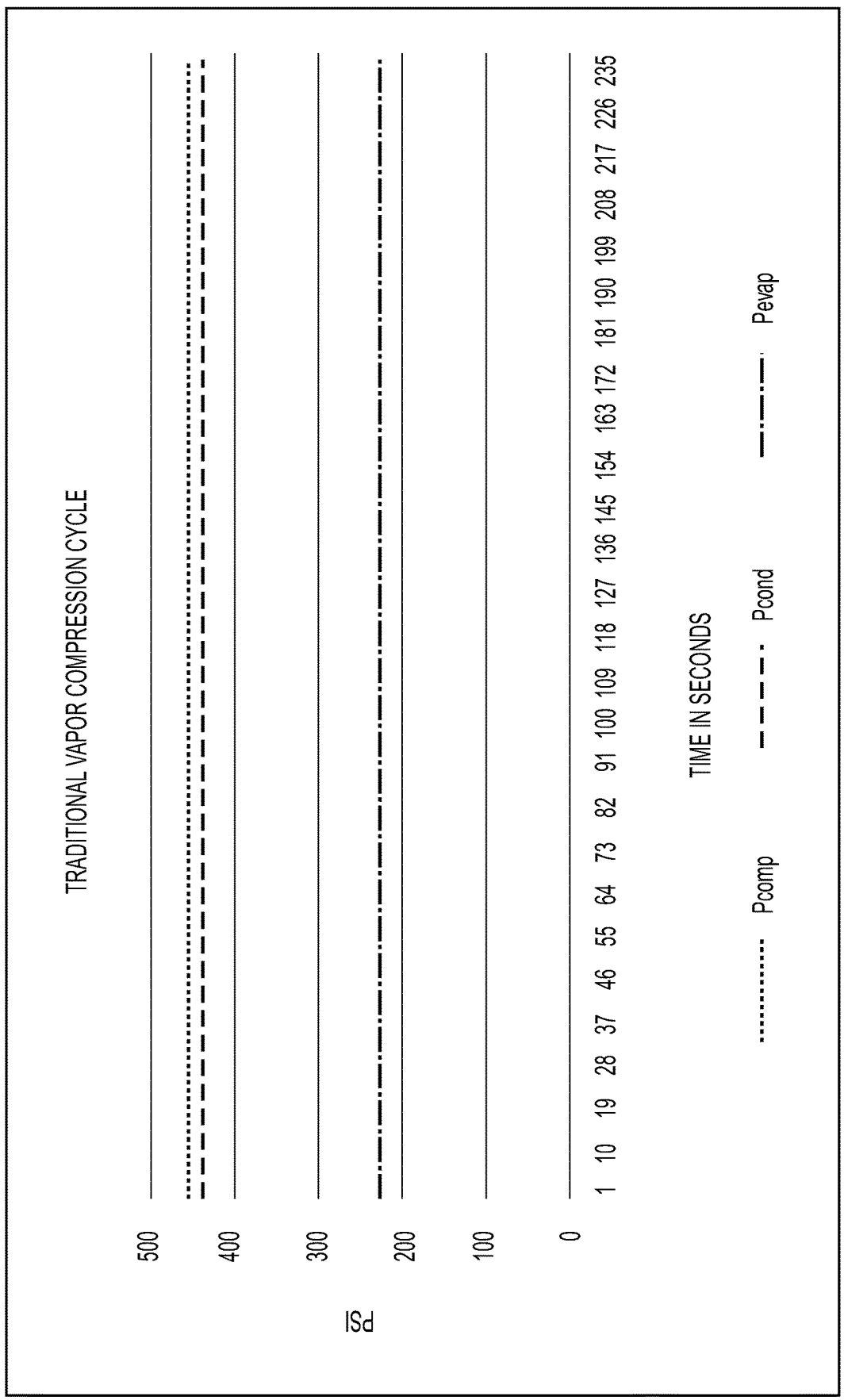
FIG. 4 shows a graph illustrating the waveforms defined by the pressures of the refrigerants in a conventional system over time when the refrigerant leaves a conventional compressor, the condenser and the evaporator of a conventional vaper-pressure loop used to provide air-conditioning or refrigeration.

In a typical vapor compression system, the refrigerant is ejected from the compressor as a high-pressure gas, then is condensed as it passes through the condenser into a high-pressure vapor, after which it is forced through a throttling valve which reduces the operating pressure of the system on the "downstream" side of the throttling valve. FIG. 4 shows a set of graphs illustrating the pressures of the refrigerants in a conventional system when the refrigerant leaves a conventional compressor, the condenser and the evaporator of a conventional vaper-pressure loop used to provide air-conditioning or refrigeration. As illustrated by the graphs in FIG. 4, the pressures of the refrigerant remain relatively constant throughout the compression cycle.

Figure 5:
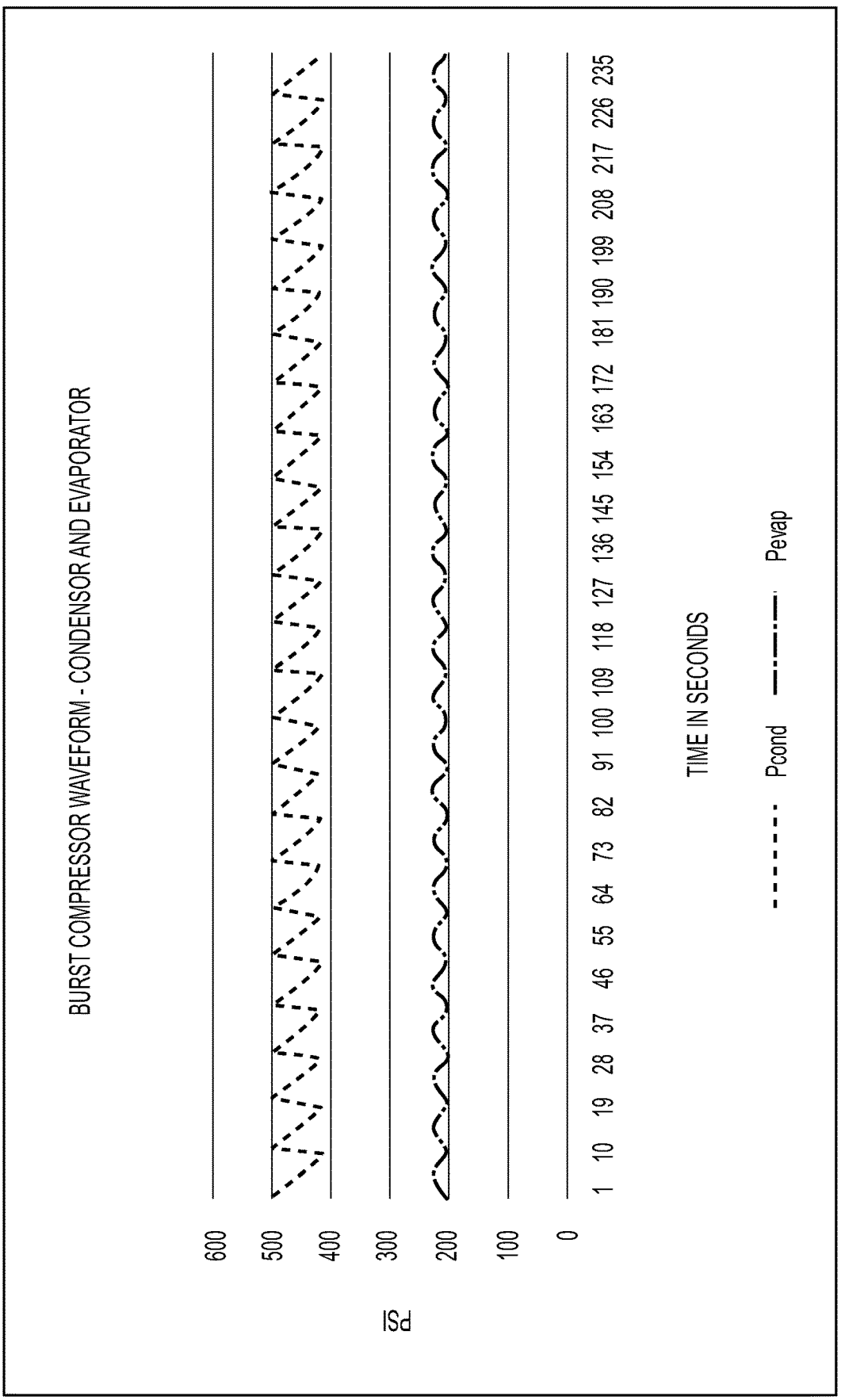
FIG. 5 shows a graph illustrating the waveforms defined by the pressure changes in the condenser and the evaporator as the refrigerant leaves the burst compressor.

In embodiments of the present invention, however, and as illustrated by the graphs shown in FIG. 5, the refrigerant leaves the burst compressor 102 in a brief burst of high-pressure gas that exceeds the steady state operating pressure in a conventional system having a conventional compressor. That brief burst is then cut off, and as the high-pressure gas refrigerant works its way through the primary condenser 130 and is condensed into a high-pressure vapor, it is also forced through the throttling valve 132 (shown in FIG. 1) to the low-pressure side of the system. The pressure throughout the system spikes immediately after the end of the burst and begins to diminish as the gas is condensed and works its way through the vapor compression cycle. This results in the sawtooth waveform shown in FIG. 5, which sees peak pressure immediately after the burst, and the lowest pressure immediately prior to the next burst. The time between the peaks constitutes a single "duty cycle" for the vapor-compression system of the present invention. The throttling valve 132 dampens the amplitude of the pressure waveform in the evaporator 134, which allows for more of steady state mass flow during operation of the system.

Figure 6:
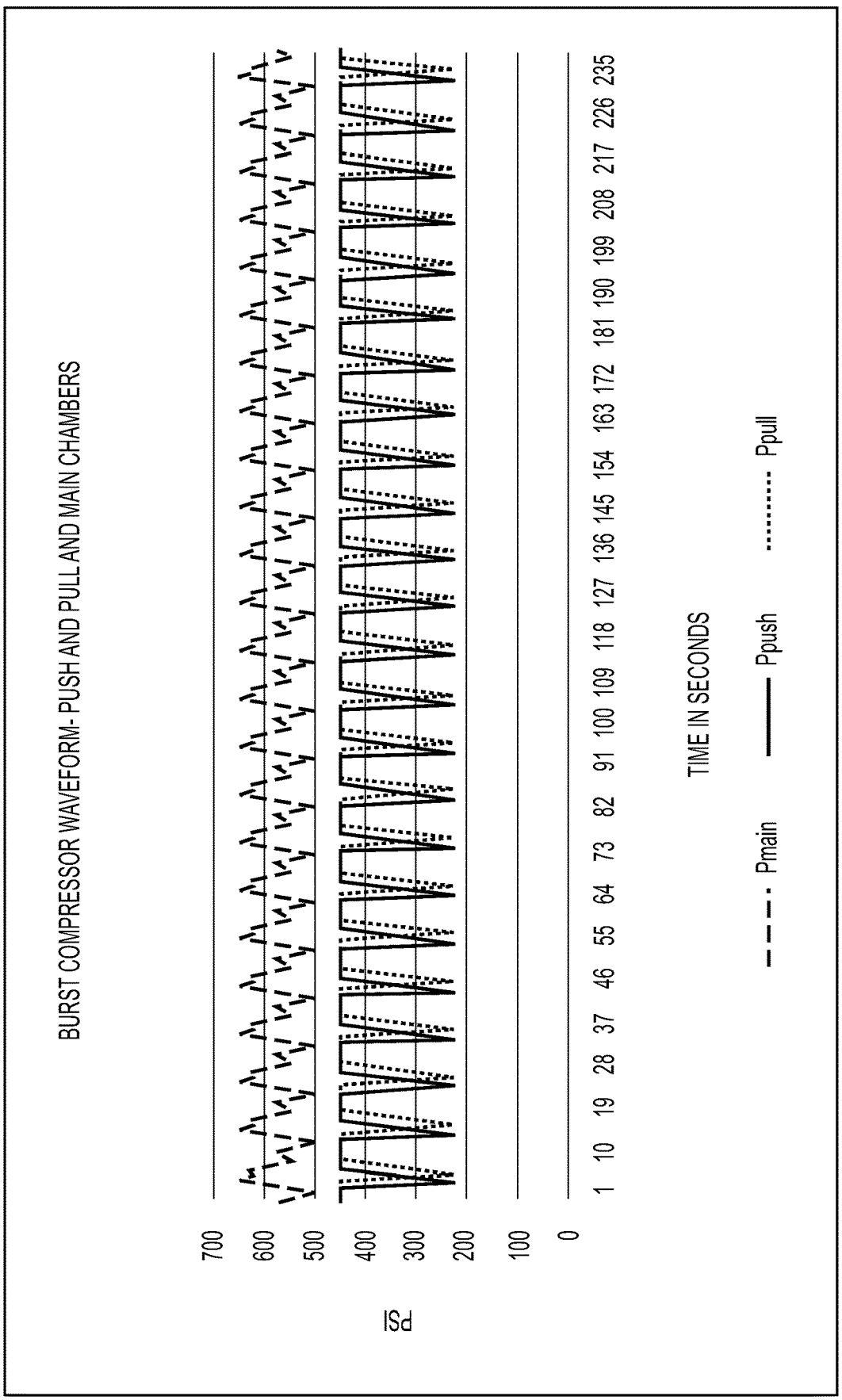
FIG. 6 shows a graph illustrating the pressure waveforms associated with the pull and push chambers 106 and 108 of the burst compressor 102 in embodiments of the present invention.

FIG. 6 shows a graph illustrating the pressure wave forms associated with the pull and push chambers 106 and 108 of the burst compressor 102 in embodiments of the present invention. Notably, in some embodiments, the pull chamber 106 and the push chamber 108 may both be contained inside the main chamber 104 of the burst compressor 102. In other embodiments, the pull chamber 106 and the push chamber 108 may be outside the main chamber 104, but still be entirely inside the burst compressor 102. The volumes of the pull chamber 106 and the pull chamber 108 are roughly equal. The volume of the main chamber 102 is larger than that of the other two chambers.

Significantly, unlike conventional systems using conventional compressors, the burst compressor 102 of the present invention is powered by heat, such as the heat 110 directed to the external wall 112 of the burst compressor 102. The three chambers of the burst compressor 102 are continuously heated to a high temperature during operation. Low pressure, low temperature refrigerant vapor from the low-pressure side of the system is forced into the burst compressor 102 via the injection piston 119 inside the injection cylinder 118 of the vapor pump 114 during each duty cycle to recharge the burst compressor 102. That low pressure, low temperature vapor is rapidly heated in the main chamber 104 of the burst compressor 102, and flashes to a high-pressure gas from the heat energy added to it in the main chamber 104.

The high-pressure gas refrigerant in the main chamber 104 is released three times during each duty cycle. The first release is at the start of the duty cycle. This is the "burst" of high-pressure gas into the primary condenser 130, as described previously. The total elapsed time of this burst comprises approximately one third of the duty cycle. Immediately upon the completion of the burst of high-pressure gas refrigerant into the primary condenser 130, high-pressure gas in the push chamber 108 is sent to the vapor pump 114 via transport tube 113a and push port 120, which drives (pushes) the drive piston 117 to its top dead center (TDC) position in the drive cylinder 116. Because the injection piston 119 is fixedly connected to the drive piston 117 by the three evenly spaced vertical rods 109, the upward movement of the drive piston 117 indirectly causes the injection piston 119 to move to its top dead center (TDC) position, which forces low pressure, low temperature vapor out of the injection cylinder 118 of the vapor pump 114 and into the main chamber 104 of the burst compressor 102. Immediately upon completion of the push cycle, high-pressure gas inside the pull chamber 106 is sent to the vapor pump 114 via the tube 113b and pull port 122, which pulls the drive piston 117 and the injection piston 119 back down to their bottom dead center (BDC) positions. As the injection piston 119 is drawn back down to BDC, it draws low pressure, low temperature vapor from the low-pressure side of the vapor compression cycle into the injection cylinder 118.

At the midpoint of the cycle, after the push function has been completed, the control system opens valve 2 between the main chamber 104 and the push chamber 108 of the burst compressor 102. See FIG. 1. The push chamber 108 has been partially depleted during the push operation, and the main chamber 104 has just been replenished. So there is a pressure differential between the two chambers. Therefore, when valve 2 between the chambers is opened, a mix of high-pressure gas and the newly injected vapor, which has begun to flash to gas, begins to flow into the push chamber 108, replenishing it. Valve 2 is then closed as the pressure begins to equalize between the main chamber 104 and the push chamber 108.

After the pull function is completed, the control system sends a signal to open valve 3 between the main chamber 104 and the pull chamber 106. The pull chamber 106 has been partially depleted during the pull operation, and the main chamber has just been replenished. So there is a pressure differential between the two chambers. When valve 3 opened, a mix of high-pressure gas and the new injected vapor, which has begun to flash to gas, begins to flow out of the main chamber and into the pull chamber 106, replenishing the pull chamber 106. Valve 3 is then closed as the pressures between the main chamber 104 and the pull chamber 106 begins to equalize. Notably, the gas-vapor mix of refrigerant in both the push and pull chambers 108 and 106 is continuously heated, which completely flashes any remaining vapor to gas, and which increases the pressure in both the push and pull chambers 108 and 106.

Figure 7:
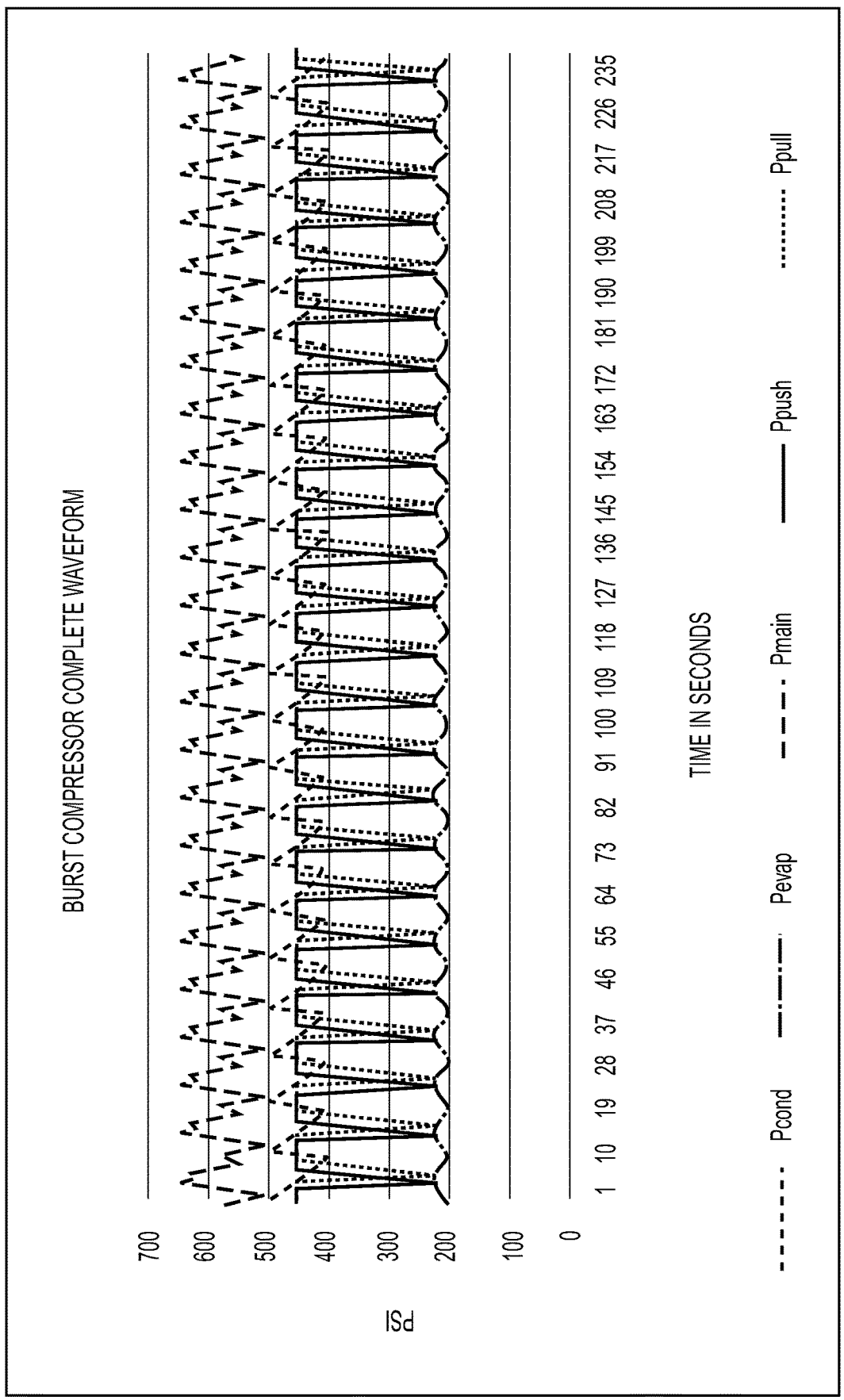
FIG. 7 shows a graph illustrating the pressure waveforms over time of the condenser, the evaporator, the main chamber, the push chamber and the pull chamber in one embodiment of the present invention.

As previously noted, the vapor pump 114 is dual-action, which means that pressure is alternately applied to both the push port 120 and then to the pull port 122, to alternately drive the pistons in the vapor pump 114 in both directions. When gas is applied to the push port 120, the gas that is on the pull side of the drive piston 117 is expelled from the pull port 122. And as gas is applied to the pull port 122, gas is expelled from the push port 120 as the drive piston 117 is driven in the opposite direction. The system is a closed system, so the expelled gas is run through a secondary condenser 124 to change its state to a vapor. The vapor is then transported into the low-pressure side of the system by allowing it to flow into and through the receiver tank 150, and then back into the main chamber 104 of the burst compressor 102. FIG. 7 shows a graph illustrating the pressure waveforms over time for the condenser, the evaporator, the main chamber, the push chamber and the pull chamber in one embodiment of the present invention.

Optional Control System

Typically, an automated (computerized) control system will be connected to the temperature and vapor compression loop in order to monitor internal and external operating conditions of the vapor compression cycle based on readings and measurements of the temperature and pressures sensors. The control system typically includes a microprocessor and a memory. The memory is used for storing temperature and pressure thresholds and measurements, as well as current states of the valves. The control system also includes wired or wireless connections suitable for communicating data and commands between the microprocessor and the sensors and valves connected to the vapor compression cycle. The control system further includes an application program, stored in the memory, the application program comprises programming modules and programming instructions that, when executed by the microprocessor, will cause the microprocessor to perform certain functions as herein described.

Figure 21:
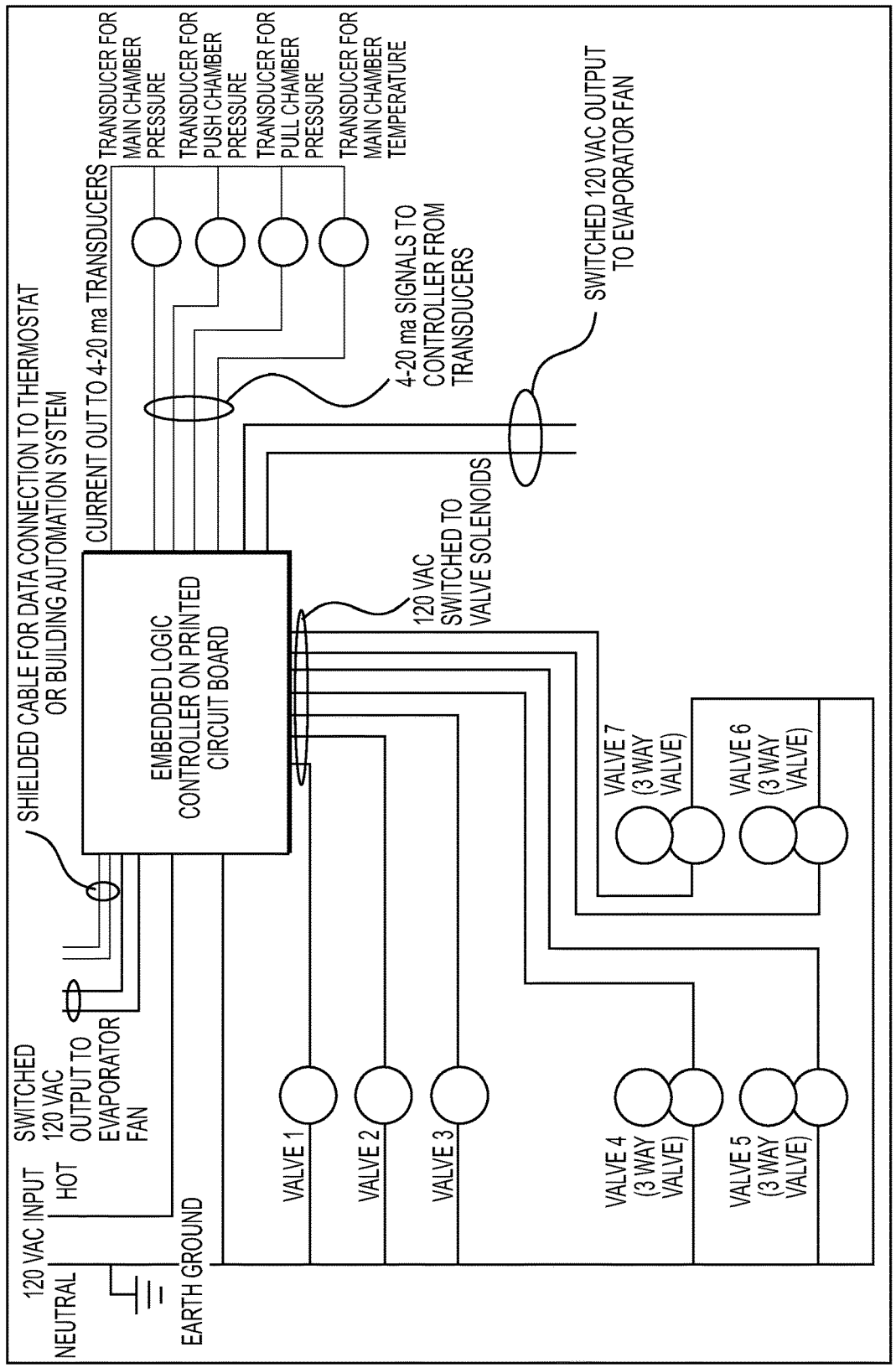
FIG. 21 contains a schematic diagram illustrating, by way of example, a wiring diagram for the junction box according to one embodiment of the invention.

For example, the application program stored in the memory of the control system may include programming modules and programming instructions to cause the microprocessor to monitor a call for cold signal received from an air-conditioning control panel and, responsive the call for cold signal, analyze whether the burst compressor is at the required minimum temperature threshold to operate. The programming modules and/or programming instructions may also be configured to monitor, receive and analyze temperature and pressure readings from the push and pull chambers 106 and 108 of the burst compressor 102, compare the readings to predefined thresholds to determine when to activate specific valves and/or when to transmit status updates and/or error messages to human-readable output devices, such as display screens, dashboards and control panels. The programming modules and instructions may also cause the microprocessor to optimize the pressures in each chamber to allow for a smooth re-start after a shutdown. At re-start, the programming instructions in the memory of the control system may be configured to cause the microprocessor to analyze the pressures in each one of the three chambers of the burst compressor 102 and send signals to activate certain valves as necessary to correct deficiencies, if any, before normal operation is commenced. The programming modules and instructions may also be arranged such that, when executed by the microprocessor, they will cause the microprocessor to determine whether any system faults have occurred and, if so, take the appropriate corrective actions based on the nature of the system faults. FIG. 21 contains a schematic diagram illustrating, by way of example, a wiring diagram for the junction box according to one embodiment of the invention.

FIGS. 8A, 8B, 8C, 8D and 8E show, respectively, a front view, a left side view a top view, a bottom view and a perspective view of the bottom, front and left side of a burst compressor 800 according to an exemplary embodiment of the present invention. As shown best in FIGS. 8A, 8B and 8C, there are five connections extending from the top of the burst compressor 800. Top connection 802 fluidly connects the main chamber 104 to transport tube 170 (shown in FIG. 1), which supplies refrigerant to the primary condenser 130. Top connection 803 fluidly connects the main chamber 104 to transport tube 172 (shown in FIG. 1), which supplies refrigerant to the pull chamber 106 via top connection 806 on the top of the burst compressor 800. Top connection 804 fluidly connects the main chamber 104 to the transport tube 174 (shown in FIG. 1), which supplies refrigerant to the push chamber 108 via top connection 808 on the top of the burst compressor 800.

Figure 8A:
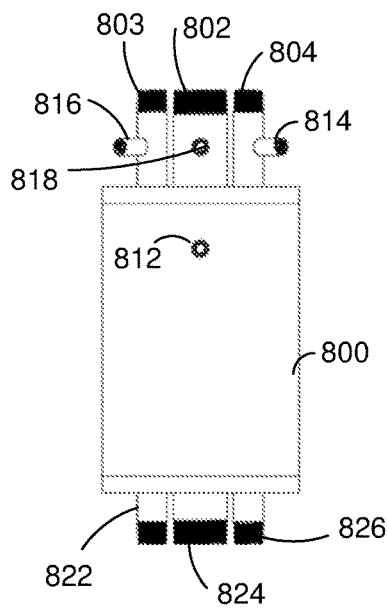
FIGS. 8A, 8B, 8C, 8D and 8E show, respectively, a front view, a left side view a top view, a bottom view and a perspective view of the bottom, front and left side of a burst compressor 800 according to an exemplary embodiment of the present invention
Figure 8B:
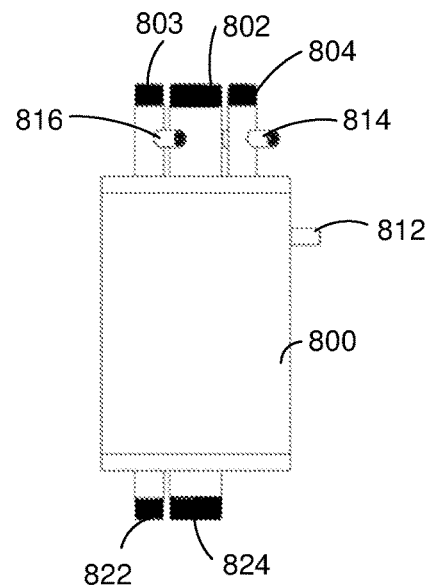
Figure 8C:
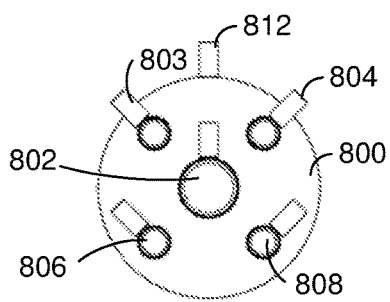
Figure 8D:
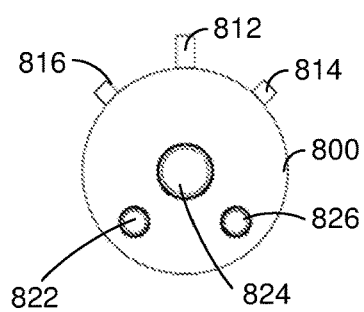
Figure 8E:
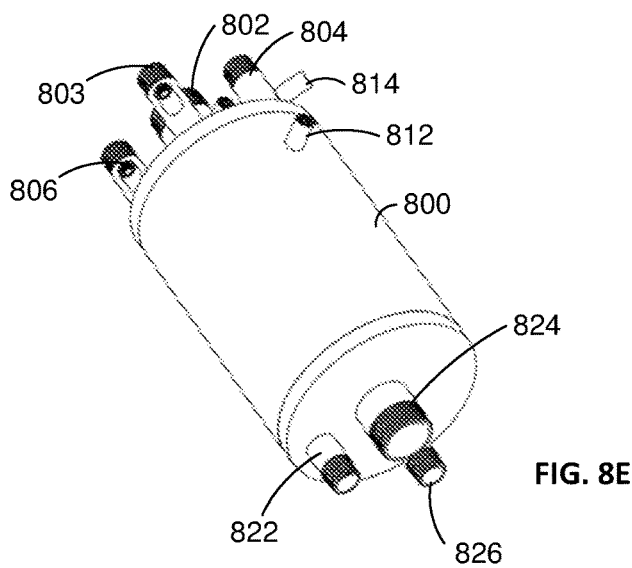

As shown best in FIGS. 8D and 8E, there are three connections on the bottom of burst compressor 800. Bottom connection 822 fluidly connects the push chamber 108 to transport tube 113a (shown in FIG. 1), which supplies refrigerant to the drive cylinder 116 of vapor pump 114 via the push port 120. Bottom connection 826 fluidly connects the pull chamber 106 to the transport tube 113b (shown in FIG. 1), which supplies refrigerant to the drive cylinder 116 of the vapor pump 114 via the pull port 122. And bottom connection 824 on the burst compressor 800 fluidly connects the main chamber 104 to the transport tube 113c to an outlet port on the injection cylinder 118 of the vaper pump 114.

A temperature transducer 812, which is connected to an external wall of the burst compressor 800, is configured to periodically detect and transmit to the control system (not shown in the figures) temperature readings for the main chamber 104 of the burst compressor 800. Pressure transducers 814, 816 and 818, which are connected, respectively, to top connections 804, 803 and 802 of the burst compressor 800, are configured to detect and transmit to the control system pressure readings at those locations. Among other things, the control system is configured to open and close valves partially empty and replenish the three chambers of the burst compressor 800 based at least on part on these temperature and pressure readings, in order to power the vapor pump 114, which in turn pumps the refrigerant through the vapor control loop, thereby reducing or eliminating the need for having an electricity- or combustion-driven motor to move refrigerant through the loop.

Figure 9:
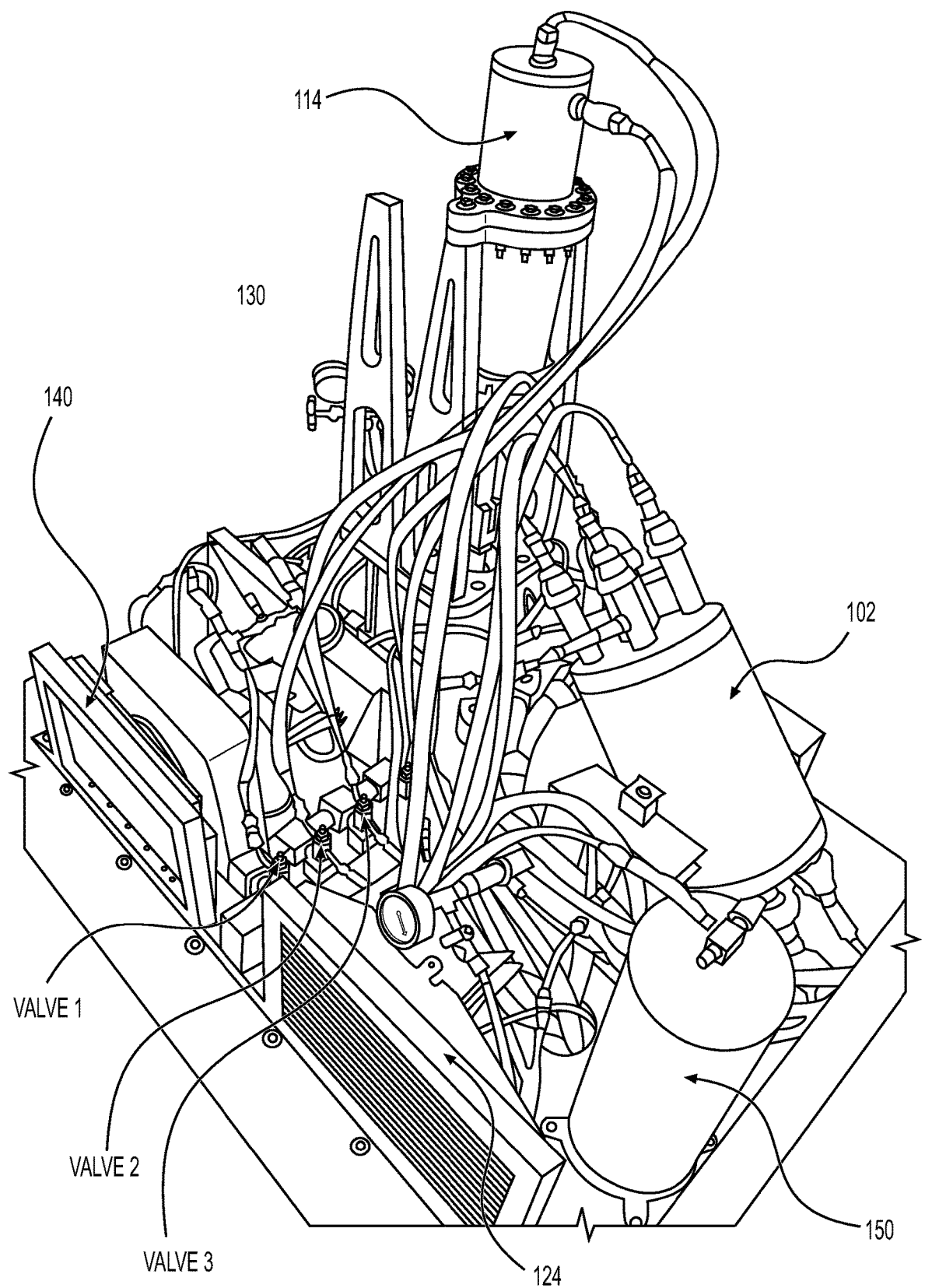
FIGS. 9-14 are provided to further illustrate, by way of example, various views of a vapor-compression system for air-conditioning and/or refrigeration, wherein the vapor-compression system is arranged and configured to operate in accordance with one embodiment of the present invention.
Figure 10:
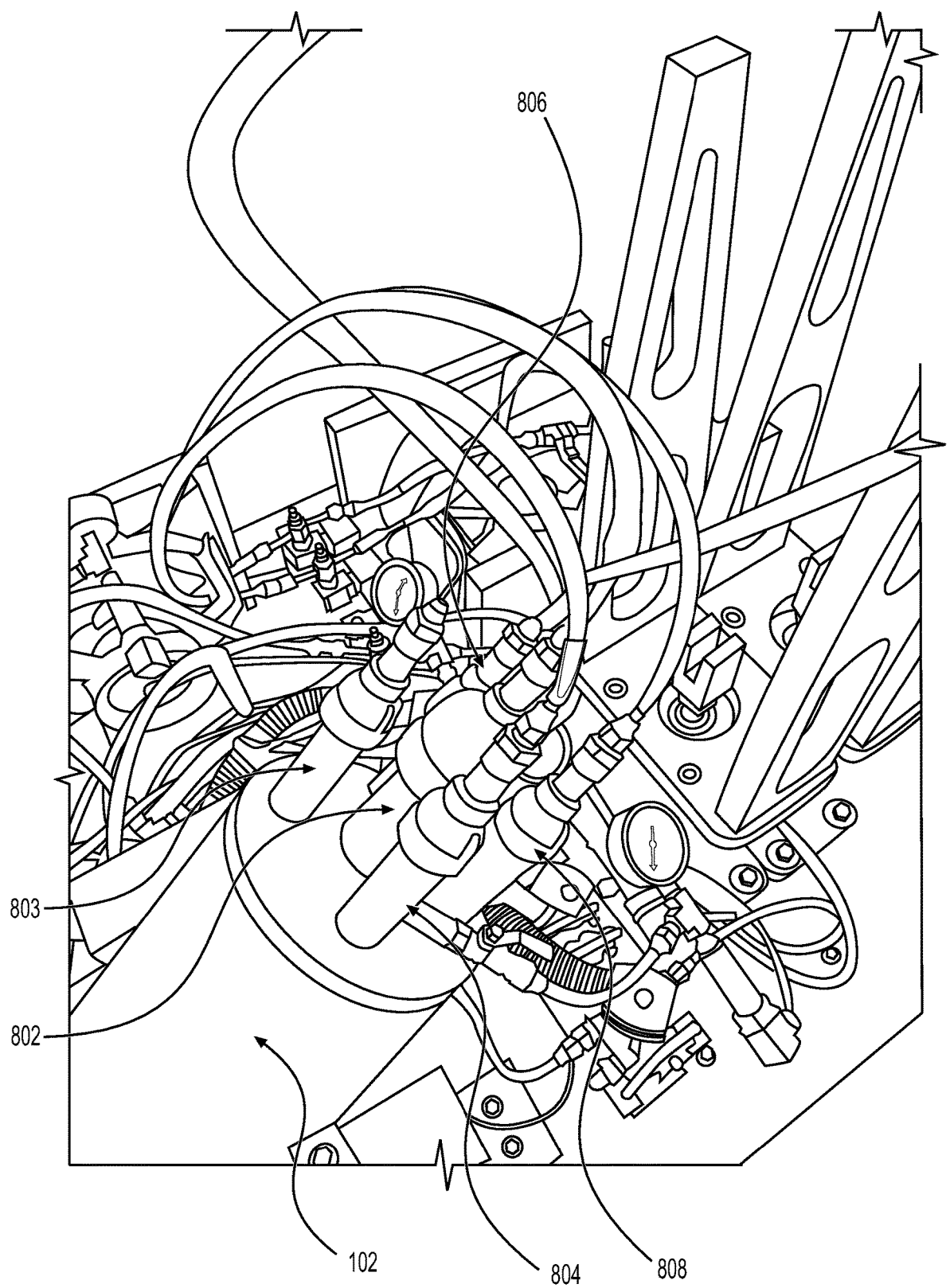
Figure 11:
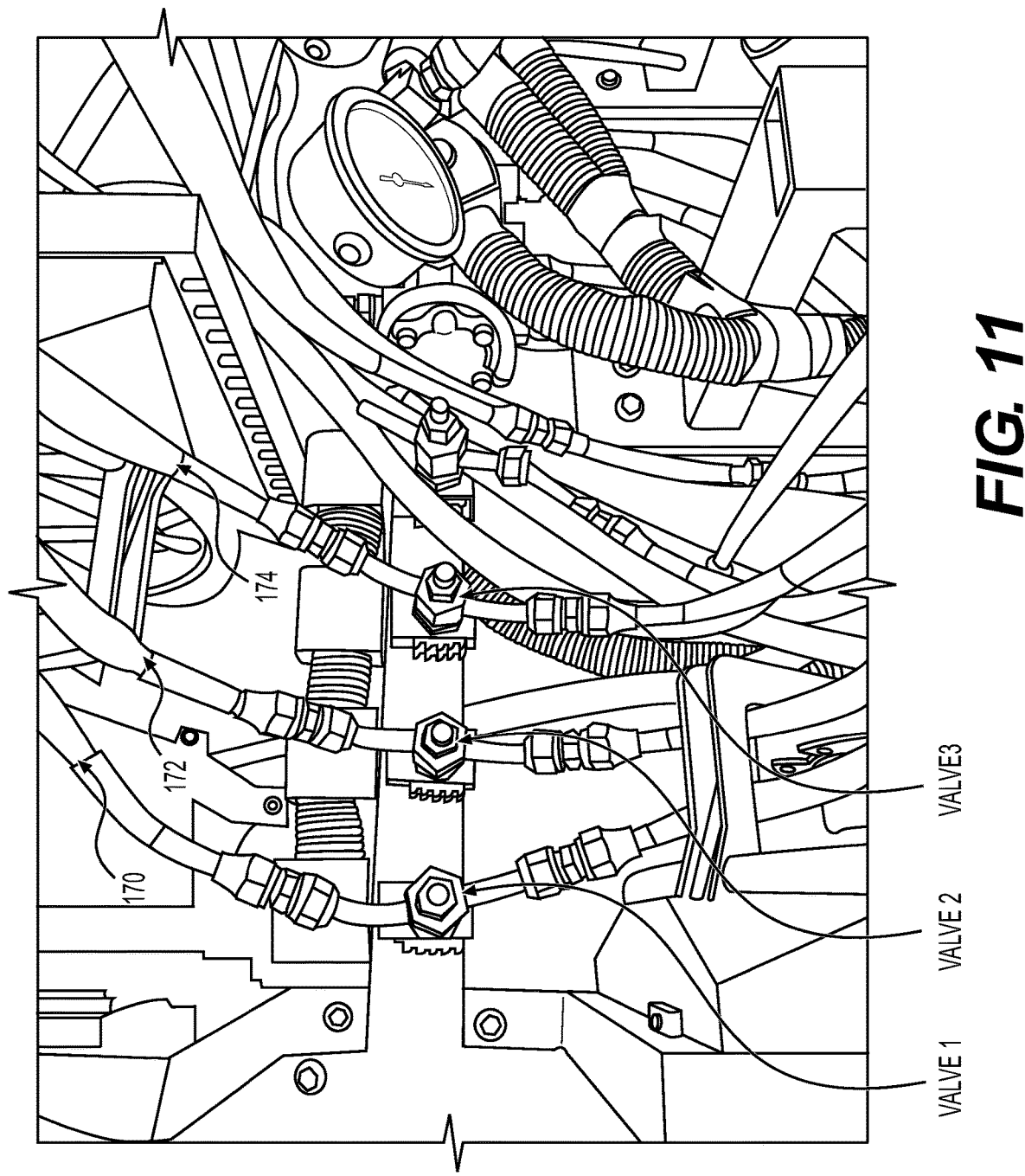
Figure 12:
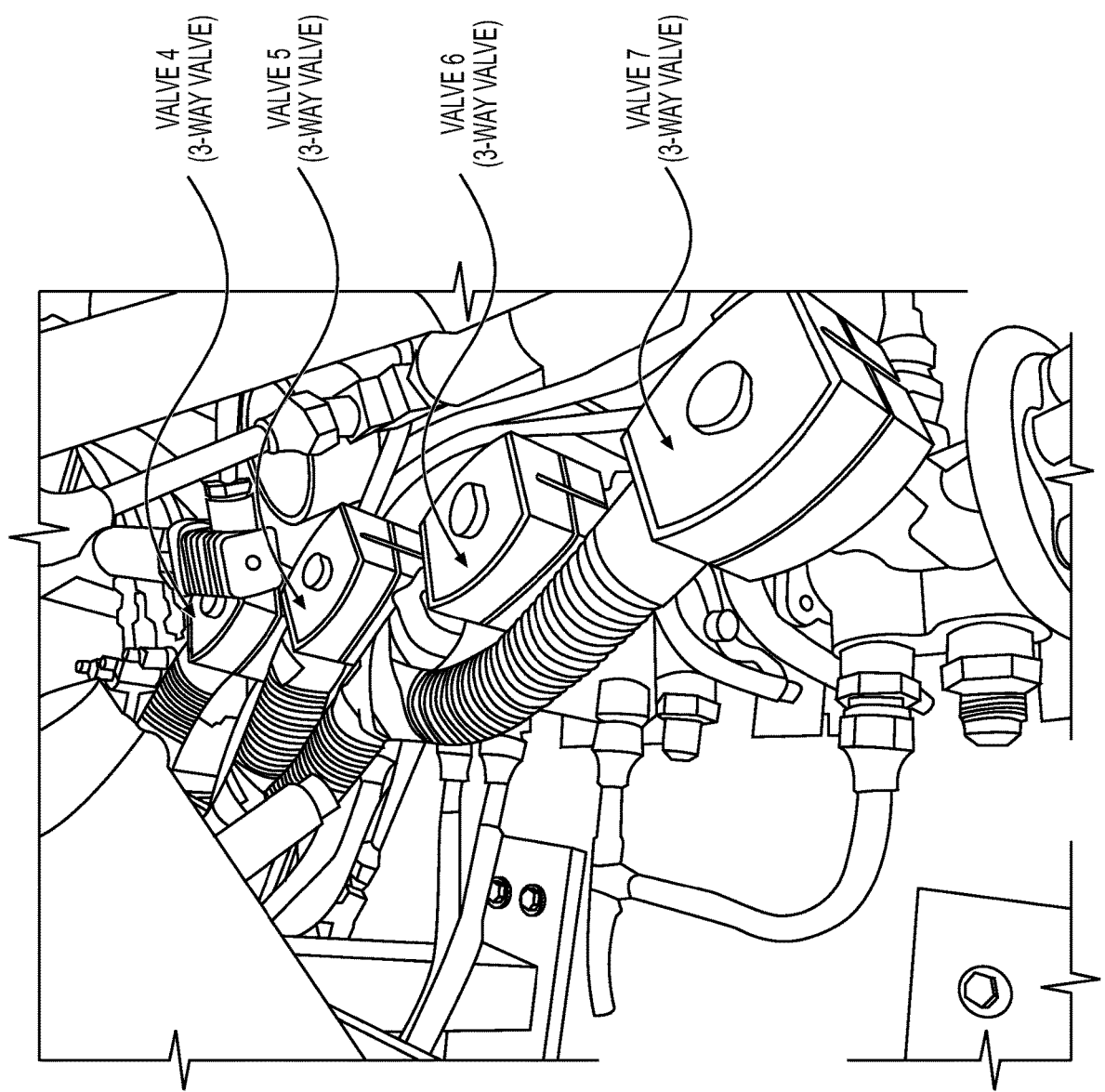
Figure 13:
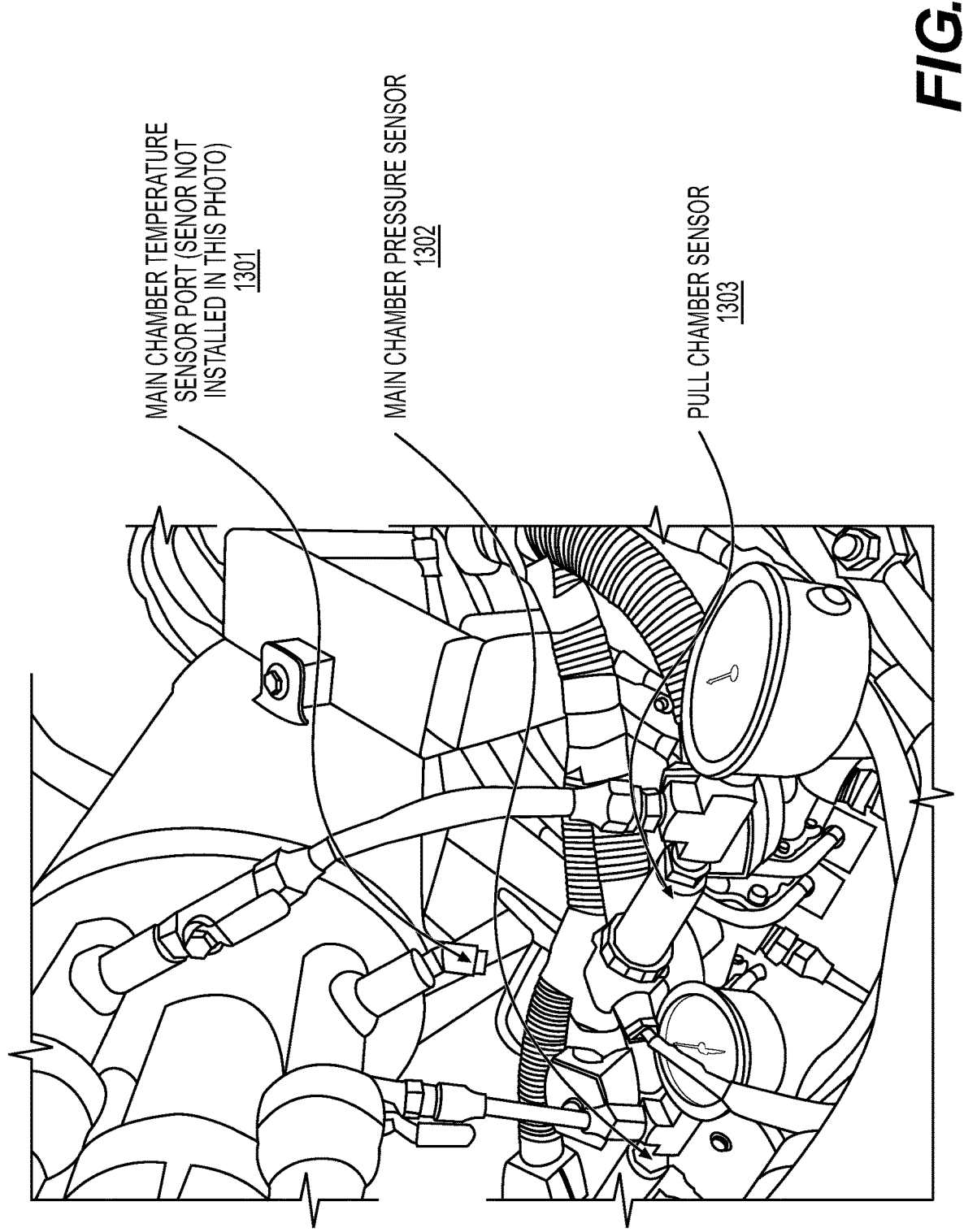
Figure 14:
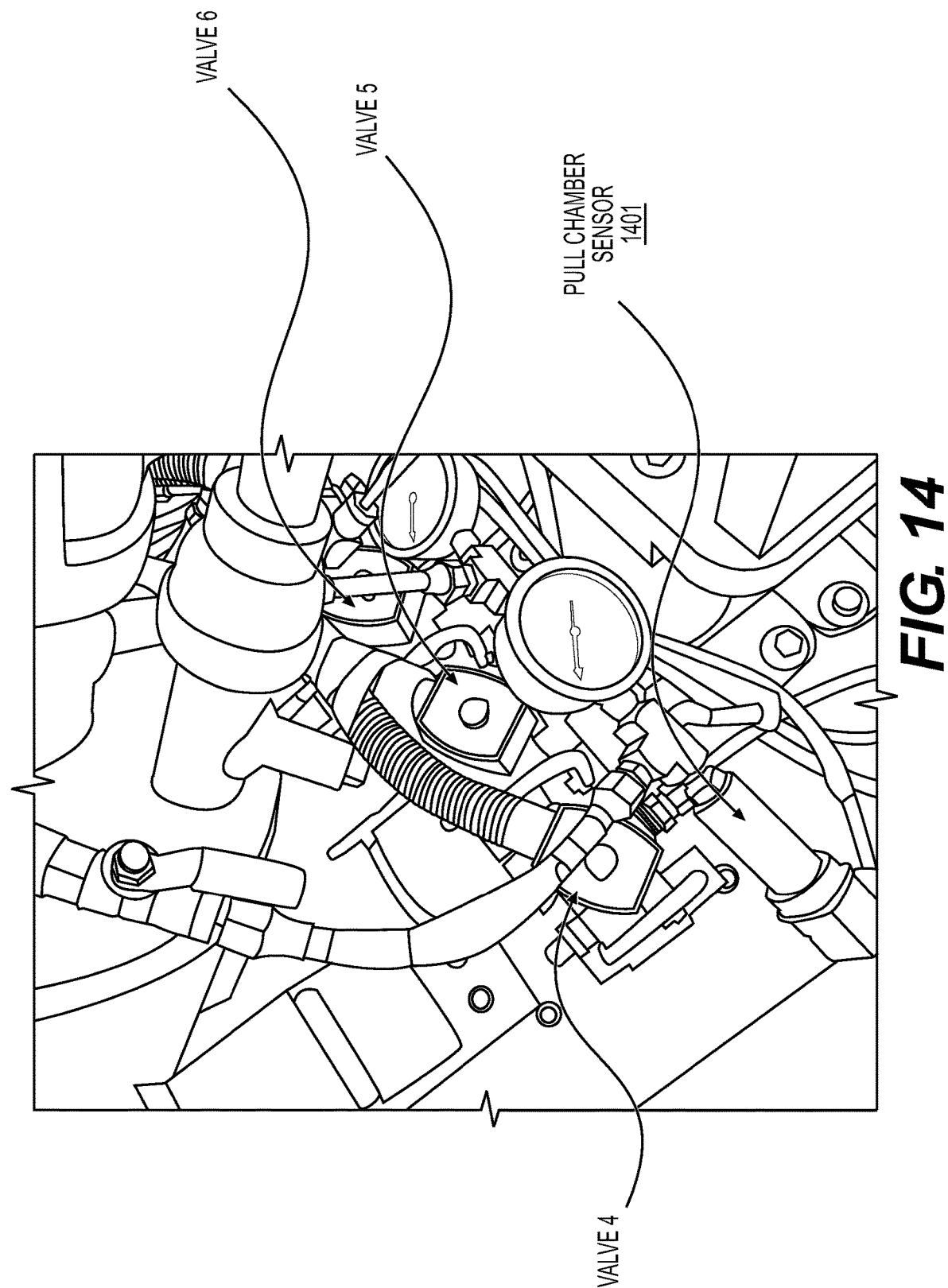

FIGS. 9-14 are provided to further illustrate, by way of example, various views of a vapor-compression system for air-conditioning and/or refrigeration, wherein the vapor-compression system is arranged and configured to operate in accordance with one embodiment of the present invention. FIG. 9 is labeled with reference numerals consistent with the reference numerals used in the diagram of FIG. 1 to further illustrate the components of the vapor compression loop of the present invention, including the burst compressor 102, the vapor pump 114, the primary condenser 130, the receiver tank 150, the secondary condenser 124, the evaporator 140 and valves 1, 2 and 3. FIG. 10 is labeled with reference numerals that are consistent with the reference numerals used in the diagram of FIG. 1 to further illustrate the top connections 802, 803 and 804 of the burst compressor 102. FIG. 11 provides a close-up view of valves 1, 2 and 3, which are connected to transport tubes 170, 172 and 174, which connect the main chamber 104 of the burst compressor 102 with the primary condenser 130, the pull chamber 106 and the push chamber 108, respectively. FIG. 12 shows a close-up view of the 3-way valves 4, 5, 6 and 7, which are connected to transport tubes fluidly connecting the burst compressor 102 to the vapor pump 114. FIG. 13 shows, in close-up view, temperature sensor port 1301 (the sensor is not connected) for the main chamber 102, the pressure sensor 1302 for the main chamber 104 and the pressure sensor 1303 for push chamber 106. FIG. 14 shows another close-up view (from a different angle) of 3-way valves 4, 5 and 6, as well as the pressure sensor 1401 for the pull chamber 106.

Embodiments of the present invention may be beneficially deployed to provide cooling for structures and enclosed spaces in a large variety of different circumstances and a large variety of different industries. Such structures and enclosed spaces may include, without limitation, single room equipment shelters, multiple-room homes, commercial buildings, portable dwellings and passenger compartments of automobiles.

Cooling for Single Room Equipment Structures

Single room equipment shelters are used in many industries for housing remotely located electronic equipment that typically must be kept cool to function properly. Examples of this include telecommunications equipment which is housed in single room equipment shelters below mobile telecom antenna installations, and safety equipment which is housed in single room equipment shelters in railroad right-of-ways to control and monitor rail traffic and railroad and road crossings. In both of these applications, the equipment in the equipment shelters typically must be kept cool to function properly. For this type of situation, cooling can be provided for the single room equipment shelters with a vapor-compression based air-conditioning unit comprising a burst compressor and vapor pump in accordance with embodiments of the present invention so that the air-conditioning system does not consume electrical power from the electrical grid for operating the vapor compression system when the heat driven system is functioning.

FIGS. 15A, 15B and 16 show high-level schematic diagrams illustrating, by way of example, how an embodiment of the present invention may be installed and used for cooling a single room structure containing heat-sensitive equipment. As shown best in FIG. 15A, the single room structure is a mobile telecom industry equipment shelter 1503, which is typically located near a cellphone tower 1504. FIG. 15B shows a closer view of the condenser unit 1501 for the vapor compression system. The vapor compression loop, which comprises the burst compressor 102 and the vapor pump 114 are located underneath and protected from the elements by an enclosure around condenser unit 1501. Typically, the condenser unit 1501 containing the vapor compression system is installed on the rooftop of the structure 1503 or on the ground in close proximity to the structure 1503. FIG. 16 shows an exploded view of the vapor compression system, illustrating the relative locations of the burst compressor 102, the primary condenser 130, the secondary condenser 124 and the vapor pump 124, all of which would normally be hidden from view underneath a vented enclosure that covers the condenser unit 1501. (For clarity, the transport tubes fluidly connecting all of the components in the vapor loop with each other are not shown in this illustration).

The heat input that powers the burst compressor 102 (which in turn creates and sends pressurized refrigerant vapor to the vapor pump 114 to drive the pistons 117 and 119), is provided by concentrated solar energy. More specifically, the burst compressor 102 derives its heat input from a beam of intense thermal energy that is focused on the surface of an external wall of the burst compressor 102 by a concentrated solar energy collector 1502, which normally sits on the top of or next to the condenser unit 1501 on the rooftop.

The evaporator 140 (not shown) is located inside the structure 1503 in an evaporator unit 1505, which also contains a fan. The typical description for this type of condenser unit 1501 and evaporator combination is a mini-split air-conditioning unit. The refrigerant gas is conducted between the condenser unit 1501 and the evaporator unit 1505 via a refrigerant lineset 1506. This lineset 1506 is designed to facilitate an in-the-field connection between the condenser unit 1501 on the roof and the evaporator unit 1505 inside the structure with quick connect fittings that contain and prevent the lineset 1506 from discharging refrigerant into the atmosphere when the lineset 1506 is disconnected. Through this quick connect-no discharge feature, there is no need to evacuate and recharge the system when the system is installed.

In addition to the burst compressor 102 and the vapor pump 114, the condenser unit 1501 also contains primary condenser 130 and secondary condenser 124, a single condenser fan, which draws outside ambient air through both the primary condenser 130 and secondary condenser 124, which expels the heated air from the condenser unit 1501. The condenser unit 1501 also contains the throttling valve 132 and a junction box, which houses the control system. FIG. 21 contains a schematic diagram illustrating, by way of example, a wiring diagram for the junction box according to one embodiment of the invention. The control system is connected to the evaporator unit 1505 via control cabling that is integral to the lineset 1506. The control cabling has quick-connect plugs to allow for rapid commissioning when the system is installed.

A thermostat located inside the structure communicates with the control system to provide a "call-for-cold" signal and a shutdown signal, which permits a desired temperature setpoint to be maintained inside the structure 1503.

Cooling for Multiple Room Homes

Multi-room homes are frequently cooled by vapor compression air-conditioning systems that are powered by electricity. These systems typically consist of an outdoor condenser unit and an indoor evaporator that is located inside an air-handler unit. The air-handler unit is typically connected to ductwork in the structure.

Figure 17:
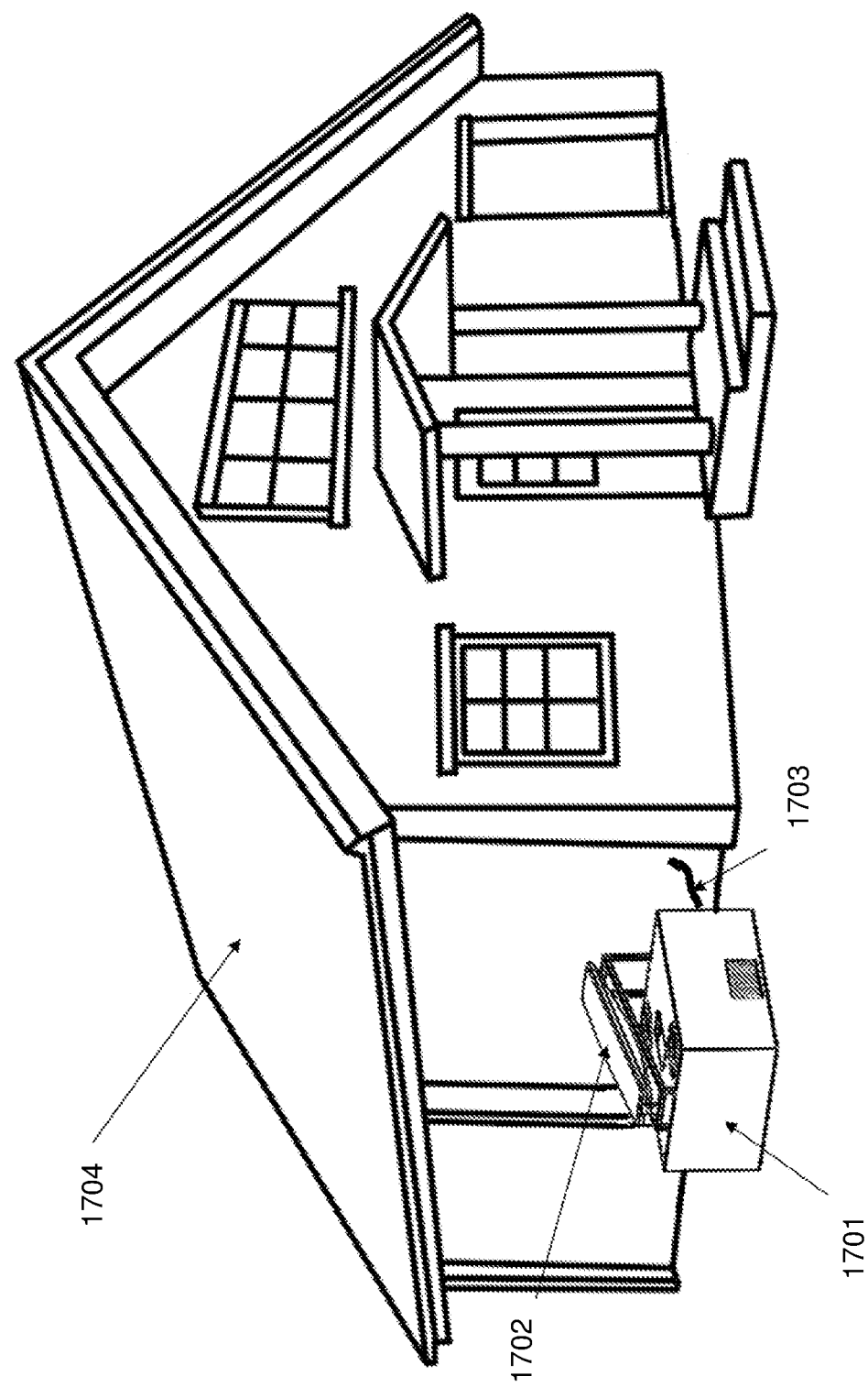
FIG. 17 shows a high-level schematic diagram illustrating, by way of example, how an embodiment of the present invention may be installed and used for cooling a multi-room home, wherein the input heat for driving the burst compressor is provided by collecting solar energy.

FIG. 17 shows a high-level schematic diagram illustrating, by way of example, how an embodiment of the present invention may be installed and used for cooling a multi-room home, wherein the input heat for driving the burst compressor 102 is provided by collecting solar energy. As illustrated in FIG. 17, cooling can be provided by a hybrid system, which consists of a vapor-compression based air-conditioning unit that contains a burst compressor 102 and a vapor pump 114 configured to operate in accordance with the present invention, as well as a traditional electrically powered air-conditioning compressor. In this case, the hybrid system can switch seamlessly between heat powered operation when concentrated solar is available as the heat input for the system, and electrically powered operation when heat is not available. When in heat powered operation mode, the system does not consume electrical power from the electrical grid for operating the vapor compression system.

For this implementation of the invention, the burst compressor 102 derives its heat input from a beam of intense thermal energy that is focused on its surface by a concentrated solar collector 1702. The burst compressor and vapor pump are located in a condenser unit 1701 which is typically located on the rooftop of the home 1704 or on the ground in close proximity to the home 1704. In FIG. 17, the condenser unit 1701 is located on the ground next to the home 1701. An evaporator is located inside the home 1704 in an air-handler unit (not shown), which includes a fan. The combination of this type of condenser unit 1701 and air-handler is typically referred to as a central air-conditioning unit. The refrigerant gas is conducted between the condenser unit 1701 outside the home 1704 and the evaporator inside the home 1704 via a refrigerant lineset 1703.

In this implementation of the present invention, the condenser unit 1701 contains the burst compressor 102 and the vapor pump 114. Preferably, the condenser unit 1701 also contains a secondary electrically powered air-conditioning compressor, which can operate the system when heat input is not available, such as at night. The condenser unit 1701 contains primary and secondary condenser coils, a single condenser fan which draws outside ambient air through both the primary and secondary condenser coils, and which expels the heated air from the condenser unit 1701 and into the outside atmosphere. The throttling valve and the control system are both located in the air-handler unit inside the home. FIG. 21 contains a schematic diagram illustrating, by way of example, a wiring diagram for the junction box according to one embodiment of the invention.

A thermostat located inside the home communicates with the control system of the air-conditioning unit via eight strand cable to provide a call-for-cold signal and a shutdown signal, which allows the air-conditioning unit to maintain a desired temperature setpoint inside the home. For home installations, a hybrid condenser unit, which houses a both a heat driven burst compressor 102 and a traditional electrically driven compressor may be preferred or required.

Cooling for Commercial Buildings

Commercial buildings that are 50,000 square feet or smaller in size are frequently cooled by multiple vapor compression air-conditioning systems that are powered by electricity. These systems typically consist of outdoor condenser units and indoor evaporators that are located inside air-handler units. The air-handler units are typically connected to ductwork in the commercial building structure.

Figure 18:
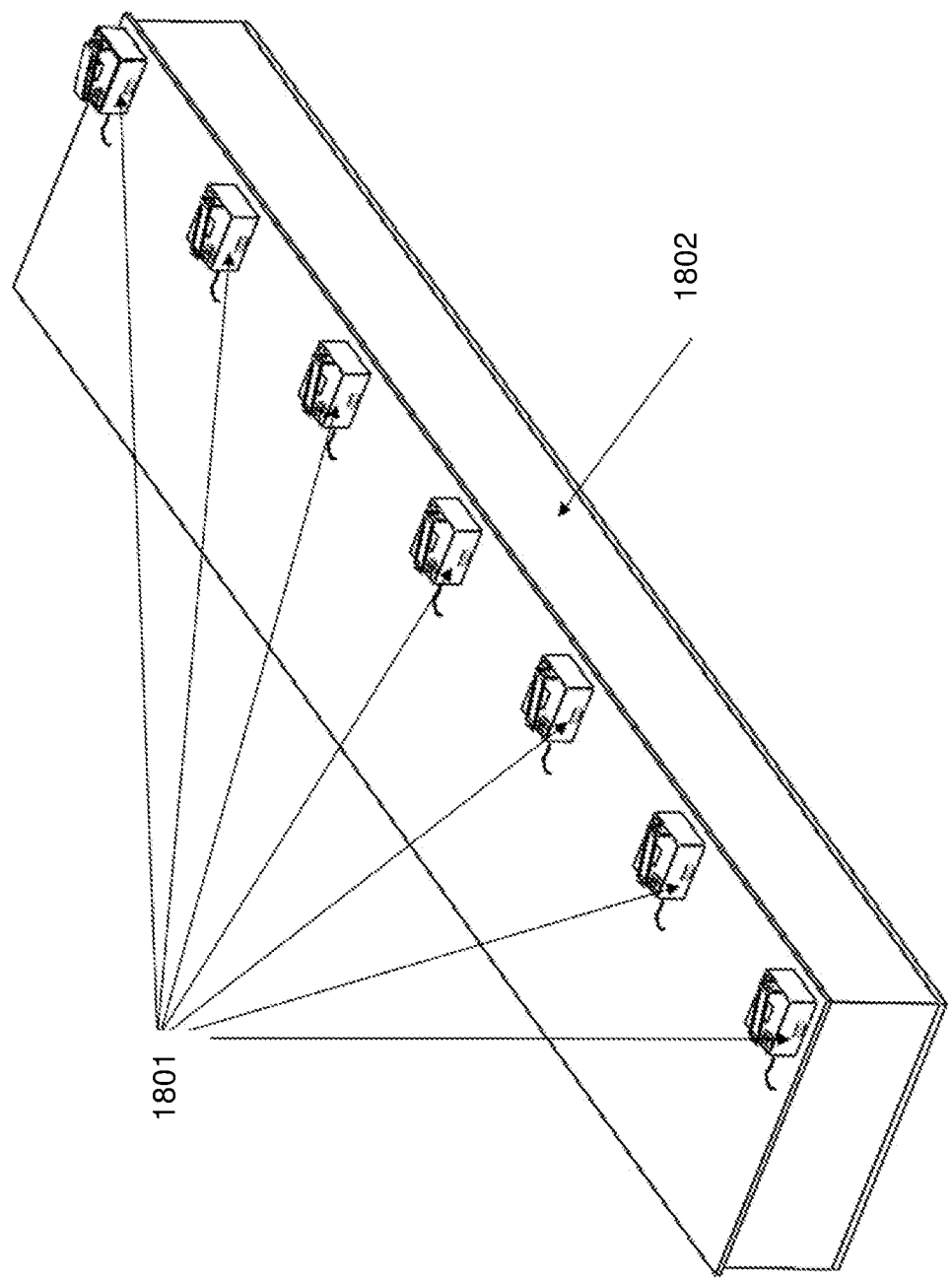
FIG. 18 shows a high-level schematic diagram illustrating, by way of example, how an embodiment of the present invention may be installed and used for cooling a commercial building.

FIG. 18 shows a high-level schematic diagram illustrating, by way of example, how an embodiment of the present invention may be installed and used for cooling a commercial building. For a commercial building application, cooling may be provided by hybrid systems, consisting of vapor-compression based air-conditioning units containing a burst compressor 102 and a vapor pump 114. The air-conditioning units may also include a traditional electrically powered air-conditioning compressor. With this arrangement, the hybrid systems can switch seamlessly between heat powered operation when concentrated solar is available to provide the heat input for the systems, and electrically powered operation when heat is not available. When in heat powered operation mode, the systems do not consume electrical power from the electrical grid for operating the vapor compression systems.

In this embodiment, the burst compressor derives its heat input from a beam of intense thermal energy that is focused on its surface by a concentrated solar collector. The burst compressor 102 and vapor pump 114 are located inside a condenser unit 1801, which is typically located on the rooftop of the commercial building 2002 or on the ground in close proximity to the commercial building 1802. Evaporators are located inside the commercial building 2002 inside air-handler units, each of which contain a fan. The typical description for this type of condenser unit and air-handler combination is a central air-conditioning unit. The refrigerant gas is conducted between the condenser unit and the evaporator via a refrigerant lineset.

For implementation in a commercial building, the condenser unit 2001 contains the burst compressor 102 and the vapor pump 114. The condenser unit 2001 may also contain a secondary electrically powered air-conditioning compressor, which can operate the system when heat input is not available. The condenser unit 1801 may also contain primary and secondary condenser coils, a single condenser fan which draws outside ambient air through both the primary and secondary condenser coils and which expels the heated air from the condenser unit. The throttling valve and the control system for each unit are located in the air-handler units which are inside the structure. Thermostats which are located inside the structure, communicate with the control system of each air-conditioning unit via eight strand cable to provide a call-for-cold and a shutdown signal and work in conjunction with the other thermostats in the building to maintain the desired temperature setpoint inside the structure.

Cooling for Portable Dwellings

Figure 19:
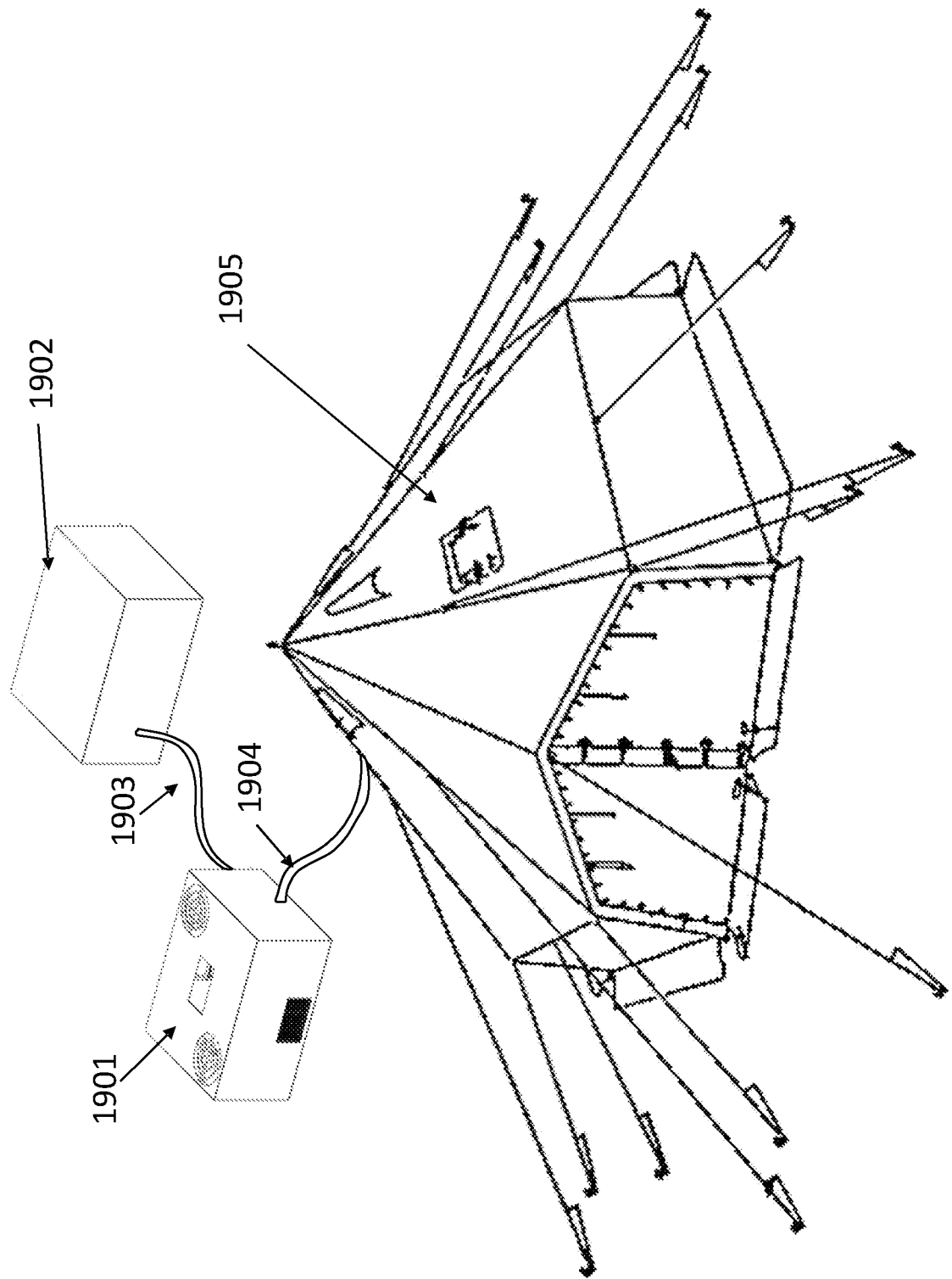
FIG. 19 shows a high-level schematic diagram illustrating, by way of example, how an embodiment of the present invention may be installed and used for cooling a portable dwelling.

FIG. 19 shows a high-level schematic diagram illustrating, by way of example, how an embodiment of the present invention may be installed and used for cooling a portable dwelling. Portable dwellings 1905 are used for many purposes, including housing warfighters in temporary encampments, housing relief workers at the scene of a natural disaster in temporary encampments, and sheltering workers at remote job sites that have no other form of shelter from the elements. In many of these applications, a portable diesel or gasoline powered electrical generator provides electrical power.

For portable dwellings, cooling can be provided for the dwelling with a portable vapor-compression based air-conditioning unit that is operated by a heat driven vapor compression system comprising a burst compressor 102 and a vapor pump 114, and thereby does not consume generator power for operating the vapor compression system.

In this embodiment, the burst compressor derives its heat input from the heat generated by the operation of the internal combustion engine that is powering the portable electrical generator 1902. The burst compressor is located on the portable electrical generator and draws its heat input through direct contact with a high temperature surface, such as the exhaust manifold, on the internal combustion engine. The vapor pump 114 (not shown) is mounted adjacent to the burst compressor 102 on the portable electric generator 1902. Both the burst compressor 102 and the vapor pump 114 are remotely located from the rest of the vapor compression air-conditioning components, which are in a separate and remotely located condenser unit 1901.

The refrigerant gas is conducted between the burst compressor 102 and the remotely located condenser unit via a refrigerant lineset 1903. This lineset is designed to facilitate an in-the-field connection to the remotely located condenser unit 1901 with quick connect fittings that contain and prevent the discharge of refrigerant into the atmosphere when the lineset 1903 is disconnected. Through this quick connect-no discharge feature, there is no need to evacuate and recharge the system each time the lineset 1903 between the burst compressor 104 and the condenser unit 1901 is disconnected. Each time the generator 1902 and the condenser unit 1901 are decommissioned to relocate them and then recommissioned at a new location, the lineset 1903 will be disconnected for decommissioning and reconnected for recommissioning. None of these activities requires evacuation of the system or recharging.

For this implementation, the remotely located condenser unit 1901 may include primary and secondary condenser coils, a single condenser fan, which draws outside ambient air through both the primary and secondary condenser coils, which expels the heated air from the condenser unit 101. The condenser unit 1901 may also contain a throttling valve and a junction box, which houses the control system (not shown in FIG. 19, but illustrated in FIG. 21). The control system is typically connected to the burst compressor 102 and vapor pump 114 via control cabling which is integral to the lineset 1903. The control cabling has quick-connect plugs to allow for rapid decommissioning and relocation of the condenser unit, as well as rapid recommissioning at a new location, if necessary.

The evaporator for the system is located in a separate insulated evaporator chamber (not shown) inside the condenser unit 1901. Located inside the insulated evaporator chamber is a fan which draws return air from the portable dwelling and forces it through the evaporator, thereby supplying the portable dwelling with cooled (conditioned) air via the flexible duct 1904 when the unit is operating.

Preferably, a wireless thermostat located inside the portable dwelling communicates with the control system of the air-conditioning unit to provide a call-for-cold and a shutdown signal. This allows for a desired temperature setpoint to be maintained inside the portable dwelling.

Cooling for Passenger Compartments of Automobiles

Air-conditioning for the passenger compartments of automobiles and other vehicles is typically produced by a vapor compression system that is driven by an air-conditioning compressor that is powered by a belt that connects the pully of the air-conditioning compressor to a pully on the internal combustion engine of the vehicle. As the engine pully rotates, it imparts rotational energy to the pully of the air-conditioning compressor, which activates the compressor. This arrangement necessarily consumes some of the power generated by the internal combustion engine.

Figure 20:
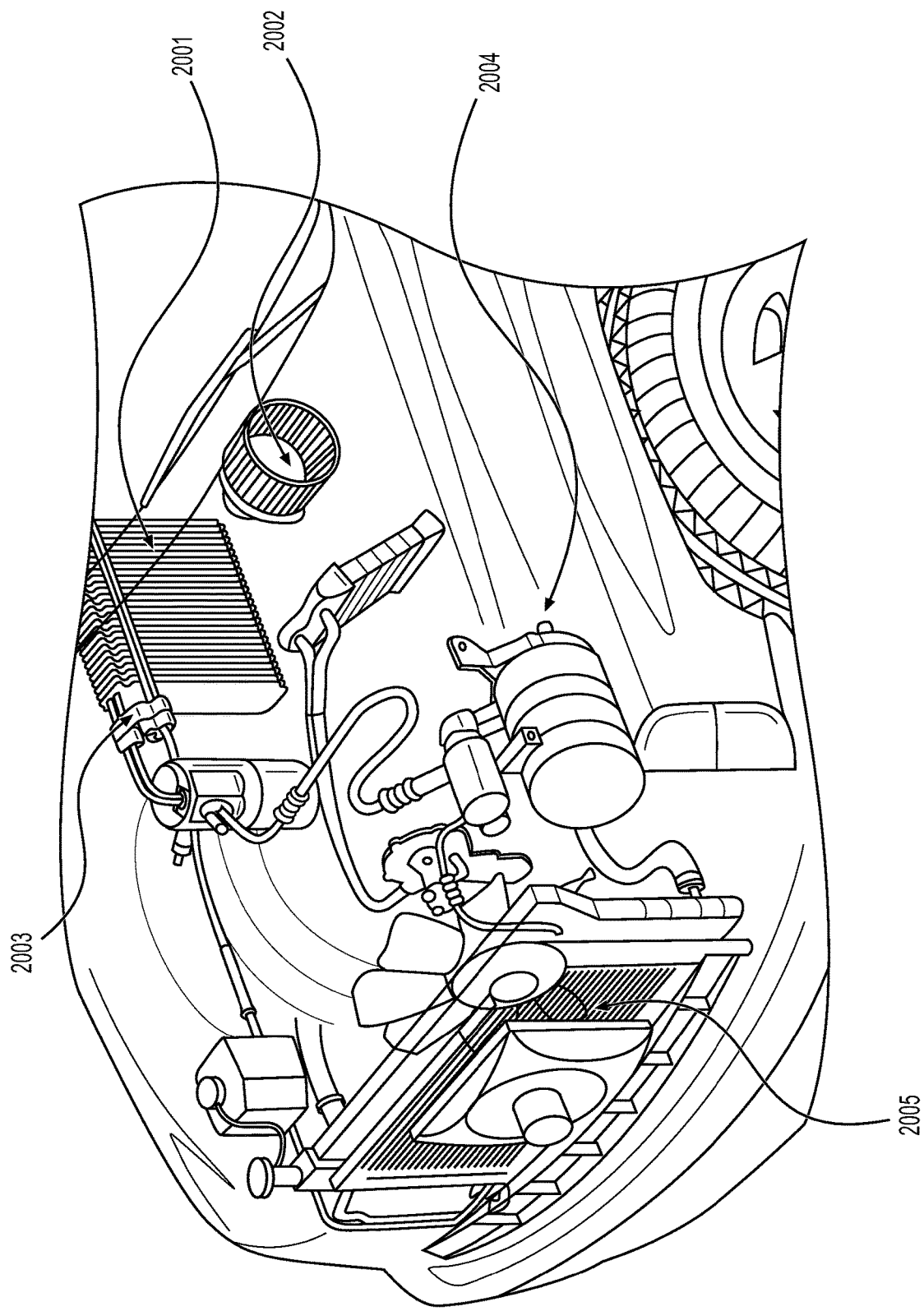
FIG. 20 shows a high-level schematic diagram illustrating, by way of example, how an embodiment of the present invention may be installed and used for cooling an automobile passenger compartment.

FIG. 20 shows a high-level schematic diagram illustrating, by way of example, how an embodiment of the present invention may be installed and used for cooling an automobile passenger compartment. For automotive applications, air-conditioning for the passenger compartment may be generated by a vapor compression system containing a burst compressor 102 with an integrated vapor pump, and thereby does not consume power from the vehicle's internal combustion engine to drive the vehicle's vapor compression air-conditioning system.

In this embodiment, the burst compressor 2004 derives its heat input from the heat generated by the operation of the internal combustion engine powering the vehicle. The burst compressor 2004 is located in the engine compartment of the vehicle and draws its heat input through direct contact with a high temperature surface, such as the exhaust manifold of the internal combustion engine. The vapor pump is an integral component within the burst compressor in this embodiment to conserve space in the engine compartment.

The refrigerant gas is conducted between the burst compressor 2004 and the primary and secondary condensers 2005 by aluminum piping in the engine compartment. The refrigerant flows from the primary condenser to the throttling valve 2003 and from the throttling valve to the vehicle's evaporator 2001. The vehicle's squirrel cage fan 2002 forces air from the passenger compartment (not shown) or from outside of the vehicle through the vehicle's evaporator 2001, where it is cooled (conditioned) before flowing into the passenger compartment. Typically, the control system for the burst compressor 2004 is integrated into the vehicle's climate control system control unit, which may also be integrated into the vehicle's main computerized control system.

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. Such variations, modifications and equivalents are intended to come within the scope of the invention and the appended claims.

What is claimed is:

1. A vapor-compression system for cooling air in an enclosed space, the vapor-compression system comprising:
    (a) a heat-driven burst compressor;
    (b) a vapor pump; and
    (c) a closed-loop circulation system fluidly coupling the heat-driven burst compressor to the vapor pump;
    (d) wherein
        (i) the vapor pump is configured to repetitively draw refrigerant from the closed-loop circulation system and inject the refrigerant into the heat-driven burst compressor, and
        (ii) the heat-driven burst compressor is configured (A) to power operation of the vapor pump by pressurizing the refrigerant and injecting a first portion of the pressurized refrigerant into the vapor pump, and (B) to periodically release a second portion of the pressurized refrigerant in bursts into the closed-loop circulation system, the periodically released bursts of the second portion of the pressurized refrigerant having an effect of driving the second portion of the pressurized refrigerant through the closed-loop circulation system.

2. The vapor-compression system of claim 1, wherein the vapor pump comprises:
    (a) an injection cylinder that is filled with some of the refrigerant; and
    (b) an injection piston movably disposed within the injection cylinder;
    (c) wherein the injection piston is configured to draw the refrigerant from the closed-loop circulation system and inject the refrigerant into the heat-driven burst compressor in response to the vapor pump receiving the first portion of the pressurized refrigerant from the burst compressor.

3. The vapor-compression system of claim 2, wherein:
    (d) the heat-driven burst compressor comprises a main chamber, a push chamber and a pull chamber;
    (e) the push chamber and the pull chamber are configured to alternately inject portions of the refrigerant into the vapor pump;
    (f) the main chamber is configured to (i) periodically release the pressurized refrigerant in bursts into the closed-loop circulation system, and (ii) periodically release said first portion of the refrigerant in bursts into the push chamber and the pull chamber to replenish the push chamber and the pull chamber after the push chamber and the pull chamber have injected the refrigerant into the vapor pump; and
    (g) the vapor pump further comprises
        (i) a drive cylinder comprising a push port and a pull port, the push port being configured to admit into the drive cylinder some of the first portion of the pressurized refrigerant sent to the vapor pump by the push chamber, and the pull port being configured to admit into the drive cylinder some of the first portion of the pressurized refrigerant sent to the vapor pump by the pull chamber, and
        (ii) a drive piston, movably disposed inside the drive cylinder, and configured to travel back and forth along a first prescribed travel path inside the drive cylinder responsive to said alternating admissions of the pressurized refrigerant into the drive cylinder by said push port and said pull port,
        (iii) wherein the drive piston is fixedly connected to the injection piston so that any travel by the drive piston along the first prescribed travel path will cause a simultaneous and equal amount of travel along a second prescribed travel path by the injection piston.

4. The vapor-compression system of claim 3, wherein:
    (h) the drive piston and the injection cylinder in the vapor pump both move upward to a top dead center position when the refrigerant is expelled from the push chamber of the heat-driven burst compressor and injected into the vapor pump via the push port;
    (i) the drive piston and the injection cylinder in the vapor pump both move downward to a bottom dead center position when the refrigerant is expelled from the pull chamber of the heat-driven burst compressor and injected into the vapor pump via the pull port; and
    (j) the vapor pump is configured so that refrigerant is forced into the main chamber of the heat-driven burst compressor both when the drive piston and the injection piston move upward toward the top dead center position and when the drive piston and the injection piston move downward toward the bottom dead center position.

5. The vapor-compression system of claim 3, wherein the injection piston is fluidly connected to the main chamber of the heat-driven burst compressor, and the injection piston is configured to inject the refrigerant directly into the main chamber of the heat-driven burst compressor.

6. The vapor-compression system of claim 1, further comprising a heat source configured to direct heat onto an exterior wall of the heat-driven burst compressor to elevate the temperature and pressure of the refrigerant inside the heat-driven burst compressor before said first portion of the pressurized refrigerant is sent to the vapor pump to power the vapor pump.

7. The vapor-compression system of claim 6, wherein the heat source comprises:
    (k) a concentrated solar energy device; or
    (l) an open flame; or
    (m) a diesel-powered generator; or;
    (n) a gasoline-powered generator; or
    (o) an internal combustion engine; or
    (p) a waste-heat exhaust manifold; or
    (q) a combination of two of more thereof.

8. The vapor-compression system of claim 3, wherein the heat-driven burst compressor does not require electricity or fossil fuel to periodically release the pressurized refrigerant into the closed-loop circulation system, the push chamber or the pull chamber.

9. The vapor-compression system of claim 3, wherein the vapor pump does not require electricity or fossil fuel to draw the refrigerant from the closed-loop circulation system and inject the refrigerant into the main chamber of the heat-drive burst compressor.

10. The system of claim 1, further comprising:
    (r) a transport tube configured to carry the first portion of the pressurized refrigerant from the heat-driven burst compressor to the vapor pump;
    (s) a valve connected to the transport tube, the valve being configured to permit or prevent the first portion of the refrigerant from passing out of the heat-driven burst compressor and into the vapor pump;

(t) a logic controller communicatively connected to the valve;

(u) a microprocessor on the logic controller;

(v) a memory in the logic controller; and (w) an application program in the memory comprising program instructions that, when executed by the microprocessor, will cause the microprocessor to open or close the valve.

11. The vapor-compression system of claim 1, further comprising:

(a) an evaporator, fluidly coupled to the closed-loop circulation system and located within an enclosed space of air or water to be cooled by the vapor-compression system;

(b) wherein the evaporator is configured to permit the second portion of the pressurized refrigerant periodically released in bursts by the burst compressor to absorb heat from the air or water in the enclosed space, thereby heating the second portion of the pressurized refrigerant and cooling the enclosed space.

12. The vapor-compression system of claim 11, further comprising:

(a) a primary condenser located in a second space outside of the enclosed space and fluidly coupled to the closed-loop circulation system;

(b) wherein the primary condenser is configured to permit the pressurized refrigerant to release into the second space some of the heat absorbed from the air or water in the enclosed space.

13. The vapor-compression system of claim 12, further comprising a receiver tank, fluidly coupled to the closed-loop circulation system, configured to receive the second portion of the pressurized refrigerant from the evaporator and permit the second portion of the pressurized refrigerant to be drawn out of the receiver tank and into the burst compressor by operation of the vapor pump.

14. The vapor-compression system of claim 13, further comprising a secondary condenser, fluidly coupled to the closed-loop circulation system between the evaporator and the vapor pump, the secondary condenser configured to receive gas refrigerant displaced from the vapor pump when the heat-driven burst compressor injects the first portion of the pressurized refrigerant into the vapor pump.

15. The vapor-compression system of claim 14, wherein the secondary condenser converts the displaced gas refrigerant into a denser state of a vapor and introduces the denser state of vaper into the receiver tank.

16. The system of claim 13, further comprising a thermal expansion valve, fluidly coupled to the closed-loop circulation system between the primary condenser and the evaporator, the thermal expansion valve being configured to reduce an operating pressure in a section of the closed-loop circulation system that is located on a downstream side of the thermal expansion valve.

\* \* \* \* \*